United States Patent
Edahiro et al.

(10) Patent No.: US 7,418,703 B2
(45) Date of Patent: Aug. 26, 2008

(54) PARALLEL PROCESSING SYSTEM BY OS FOR SINGLE PROCESSOR

(75) Inventors: Masato Edahiro, Tokyo (JP); Yoshiyuki Ito, Tokyo (JP); Junji Sakai, Tokyo (JP); Tetsuya Minakami, Tokyo (JP); Hiroaki Inoue, Tokyo (JP)

(73) Assignee: NEC Corporation, Tokyo (JP)

( * ) Notice: Subject to any disclaimer, the term of this patent is extended or adjusted under 35 U.S.C. 154(b) by 802 days.

(21) Appl. No.: 10/390,595

(22) Filed: Mar. 19, 2003

(65) Prior Publication Data

US 2003/0182355 A1    Sep. 25, 2003

(30) Foreign Application Priority Data

Mar. 20, 2002    (JP)    ............................... 2002-079225

(51) Int. Cl.
    *G06F 9/46*    (2006.01)
(52) U.S. Cl. ..................................................... 718/100
(58) Field of Classification Search ..................... 718/1, 718/101, 100
    See application file for complete search history.

(56) References Cited

U.S. PATENT DOCUMENTS

| | | | |
|---|---|---|---|
| 4,644,465 A | * | 2/1987 | Imamura ..................... 710/263 |
| 5,201,040 A | * | 4/1993 | Wada et al. .................. 711/147 |
| 5,257,372 A | | 10/1993 | Furtney et al. |
| 5,428,803 A | * | 6/1995 | Chen et al. ..................... 712/6 |
| 5,652,833 A | * | 7/1997 | Takizawa et al. .............. 714/10 |
| 5,774,693 A | * | 6/1998 | Hsu et al. ...................... 703/22 |
| 6,295,645 B1 | * | 9/2001 | Brewer ......................... 717/178 |
| 6,581,089 B1 | | 6/2003 | Inamura |

FOREIGN PATENT DOCUMENTS

| | | |
|---|---|---|
| EP | 0 049 521 A3 | 4/1982 |
| EP | 0 491 342 A2 | 6/1992 |
| JP | 57-064589 | 4/1982 |
| JP | 57-064859 | 4/1982 |
| JP | 58-225469 | 12/1983 |
| JP | 01-217536 | 8/1989 |
| JP | 03-113563 | 5/1991 |
| JP | 03-257652 | 11/1991 |
| JP | 05-324574 | 7/1993 |
| JP | 5-216 851 | 8/1993 |
| JP | 05-216851 | 8/1993 |
| JP | 5-324574 | 12/1993 |
| JP | 08-272755 | 1/1996 |
| JP | 10-040414 | 3/1998 |
| JP | 11-306038 | 11/1999 |
| WO | WO 88/08162 | 10/1988 |

* cited by examiner

*Primary Examiner*—Meng-Ai An
*Assistant Examiner*—Camquy Truong
(74) *Attorney, Agent, or Firm*—Foley & Lardner LLP

(57) ABSTRACT

The present invention relates to a parallel processing system by an OS for single processor capable of operating an OS for single processor and an existing application on a multiprocessor and achieving parallel processing by a multiprocessor with respect to the application, wherein the multiprocessor are logically divided into two groups, i.e., a first processor side and a second processor side, and units of work that are parallelizable within the application operating on the processors on the first processor side are controlled as new units of work on the processors on the second processor side.

38 Claims, 16 Drawing Sheets

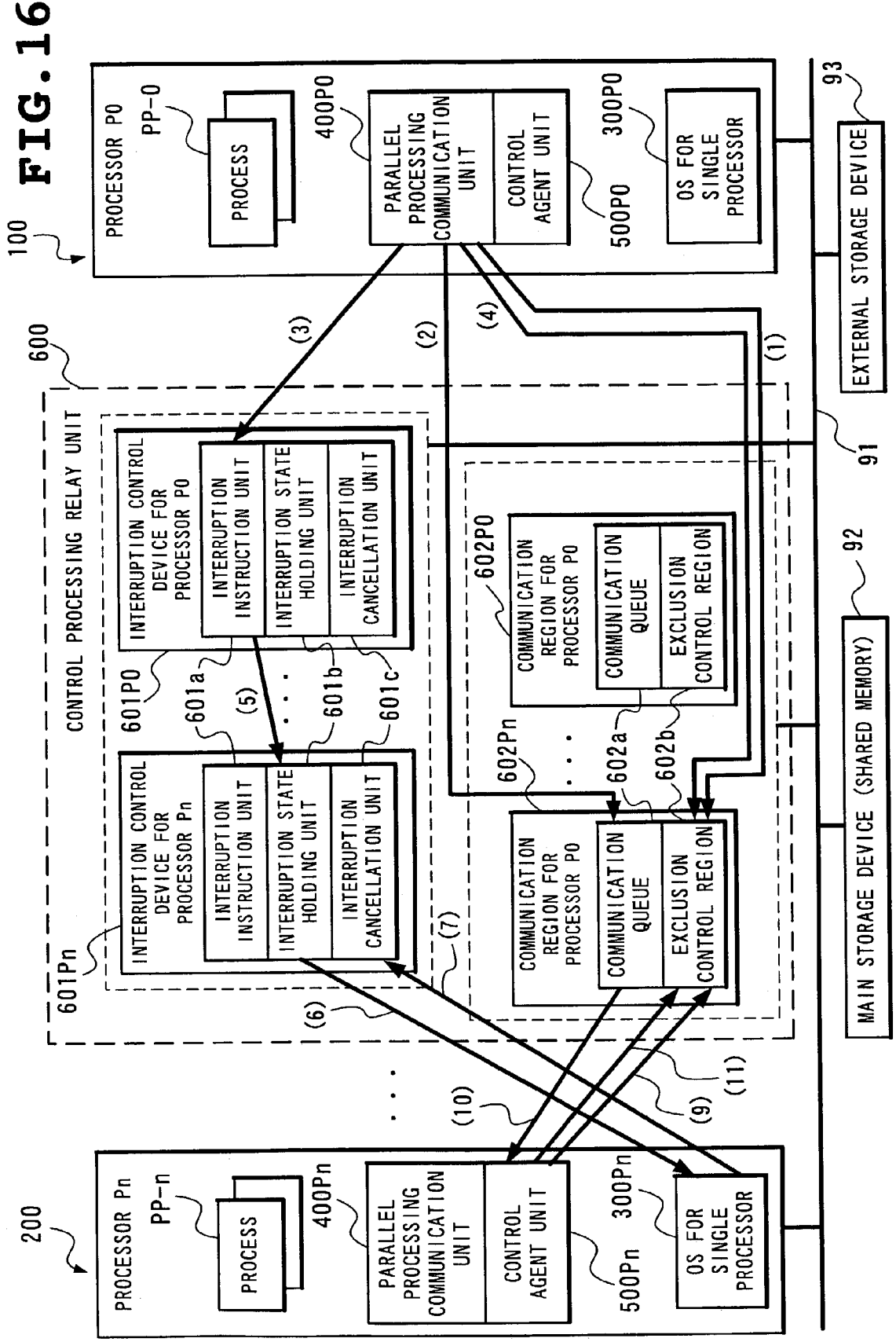

PARALLEL PROCESSING SYSTEM BY OS FOR SINGLE PROCESSOR

BACKGROUNDS OF THE INVENTION

1. Field of the Invention

The present invention relates to a parallel processing system by a multiprocessor, in particular, it relates to a parallel processing system by an OS for single processor capable of operating the OS and an existing application for single processor on a multiprocessor and achieving parallel processing by the multiprocessor with respect to the application.

2. Description of the Related Art

In data processing devices such as mobile terminals including mobile phones and mobile PCs, in the current situation, an operating system for single processor (hereinafter referred to as OS for single processor) and an application for single processor (hereinafter simply referred to as application) are basically executed on a single processor.

In such a situation, if the application is to be used as-is on a multiprocessor basis, it is necessary to execute the application on an OS for multiprocessor instead of the OS for single processor.

As systems that control the execution of OSes and applications for multiprocessor on multiprocessor systems such as the one described above, prior arts are disclosed, for example, in the Japanese Patent Laid-open No. Heisei 3-257652 and Heisei 3-113563.

The Japanese Patent Laid-open No. Heisei 3-257652 discloses a method for controlling the interruption between each processor element in a multiprocessor system consisting of a plurality of processor elements.

The Japanese Patent Laid-open No. Heisei 3-113563 discloses a method for scheduling processes assigned to a plurality of processors in a multiprocessor system.

However, when an existing application is operated on the OS for multiprocessor as in the prior art, there is the problem that the OS for multiprocessor provides services for multiprocessor regardless of the fact that the application uses only one among a plurality of processors, or it proceeds with processing the exclusion of the other processors regardless of the fact that other applications are not operating, such that these extra processing lead to overheads.

Moreover, if the application were modified for use with a multiprocessor, the above problem would be solved, however, it would lead to a different problem that considerable labor and cost would be necessary for the modification.

Furthermore, when the application is used as-is on the existing OS for single processor, there is a high demand that the existing application be operated as-is on a multiprocessor.

SUMMARY OF THE INVENTION

One object of the present invention is to provide a parallel processing system capable of operating an OS and an existing application for single processor on a multiprocessor without adding any modification to them, and achieving parallel processing by the multiprocessor with respect to the application.

Another object of the present invention is to provide a parallel processing system capable of operating an OS and an existing application for single processor on a multiprocessor without adding any modification to them, and at the same time, controlling units of work (UOWs) of the application between each processor synchronously and asynchronously.

According to the first aspect of the invention, a parallel processing system by an OS for single processor capable of operating an OS for single processor and an application on a multiprocessor and achieving parallel processing by the multiprocessor with respect to the application, with the requirements of logically dividing the multiprocessor into two groups, i.e., a first processor side and a second processor side, and controlling units of work that are parallelizable within the application operating on a processor on the first processor side as new units of work on processors on the second processor side.

In the preferred construction, the units of work that are parallelizable within the application are precreated on the processors on the second processor side.

In another preferred construction, the units of work that are parallelizable within the application are created and activated as new units of work on the processors on the second processor side.

In another preferred construction, the OS for single processor provided with a virtual storage mechanism is mounted on the processor on the first processor side and each processor on the second processor side.

In another preferred construction, the new units of work on the processors on the second processor side are controlled synchronously or asynchronously with the units of work on the processor on the first processor side.

In another preferred construction, a parallel processing unit for performing controls related to the units of work including the creation of the units of work, and an OS service unit for providing a service for the OS for single processor to the units of work are incorporated on each of the first processor side and the second processor side.

In another preferred construction, a control processing relay unit for exchanging control signals and data between the first processor side and the second processor side is provided.

In another preferred construction, the control processing relay unit being provided with interruption control devices corresponding to each processor, and communication regions corresponding to each processor, the interruption control devices being configured by an interruption instruction unit for instructing the other processors to interrupt, an interruption state holding unit for holding the information that there was an interruption due to an interruption instruction, and an interruption cancellation unit for clearing the interruption, and the communication regions being configured by a communication reason holding region for holding the information on the reason for communication from a communicating processor, a communication data holding region for holding communication data for communication, and an exclusion control region for locking the communication region for securing the communication.

In another preferred construction, the control processing relay unit being provided with interruption control devices corresponding to each processor, and communication regions corresponding to each processor, the interruption control devices being configured by an interruption instruction unit for instructing the other processors to interrupt, an interruption state holding unit for holding the information that there was an interruption due to an interruption instruction, and an interruption cancellation unit for clearing the interruption, and wherein the communication regions are configured by a communication queue for holding communication data to communicate with the information on the reason for communication from the communicating processor, and an exclusion control region for locking the communication region for securing the communication.

In another preferred construction, an agent unit is provided on the first processor side, associated with the units of work on the second processor side by UOW numbers to perform notification of various control signals between the units of work on the second processor side and the OS for single processor.

In another preferred construction, the parallel processing unit, the OS service unit, the control processing relay unit, and the agent unit are incorporated in a modular fashion.

In another preferred construction, a function is provided on the parallel processing unit on the second processor side for creating units of work to be parallelly processed by the other processors on the second processor side.

According to the second aspect of the invention, a parallel processing system by an OS for single processor capable of operating an OS for single processor and an application on a multiprocessor and achieving parallel processing by the multiprocessor with respect to the application, with the requirements of logically dividing the multiprocessor into two groups, i.e., a first processor side and a second processor side, operating the OS for single processor and the application on a processor on the first processor side, and controlling the units of work that are parallelizable within the application as new units of work on the processors on the second processor side.

In the preferred construction, the units of work that are parallelizable within the application are precreated on the processors on the second processor side.

In another preferred construction, the units of work that are parallelizable within the application are created and activated as new units of work on the processors on the second processor side.

In another preferred construction, the OS for single processor provided with a virtual storage mechanism is mounted on the processor on the first processor side and each processor on the second processor side.

In another preferred construction, the new units of work on the processors on the second processor side are controlled synchronously or asynchronously with the units of work on the processor on the first processor side.

In another preferred construction, a parallel processing unit for performing controls related to the units of work including the creation of the units of work, and an OS service unit for providing a service for the OS for single processor to the units of work are incorporated on each of the first processor side and the second processor side.

In another preferred construction, a control processing relay unit for exchanging control signals and data between the first processor side and the second processor side is provided.

In another preferred construction, the control processing relay unit being provided with interruption control devices corresponding to each processor, and communication regions corresponding to each processor, the interruption control devices being configured by an interruption instruction unit for instructing the other processors to interrupt, an interruption state holding unit for holding the information that there was an interruption due to an interruption instruction, and an interruption cancellation unit for clearing the interruption, and the communication regions being configured by a communication reason holding region for holding the information on the reason for communication from a communicating processor, a communication data holding region for holding communication data for communication, and an exclusion control region for locking the communication region for securing the communication.

In another preferred construction, the control processing relay unit being provided with interruption control devices corresponding to each processor, and communication regions corresponding to each processor, the interruption control devices being configured by an interruption instruction unit for instructing the other processors to interrupt, an interruption state holding unit for holding the information that there was an interruption due to an interruption instruction, and an interruption cancellation unit for clearing the interruption, and wherein the communication regions are configured by a communication queue for holding communication data to communicate with the information on the reason for communication from the communicating processor, and an exclusion control region for locking the communication region for securing the communication.

In another preferred construction, an agent unit is provided on the first processor side, associated with the units of work on the second processor side by UOW numbers to perform notification of various control signals between the units of work on the second processor side and the OS for single processor.

In another preferred construction, the parallel processing unit, the OS service unit, the control processing relay unit, and the agent unit are incorporated in a modular fashion.

In another preferred construction, a function is provided on the parallel processing unit on the second processor side for creating units of work to be parallelly processed by the other processors on the second processor side.

According to the third aspect of the invention, a program for parallel processing by an OS for single processor capable of operating an OS for single processor and an application on a multiprocessor and achieving parallel processing by the multiprocessor with respect to the application, having the function of, on a system in which the multiprocessor are logically divided into two groups, i.e., a first processor side and a second processor side, performing a function for controlling units of work that are parallelizable within the application operating on a processor on the first processor side as new units of work on processors on the second processor side.

In the preferred construction, the program for parallel processing by the OS for single processor has a function for precreating the units of work that are parallelizable within the application on the processor on the second processor side.

In another preferred construction, the program for parallel processing by the OS for single processor has a function for creating and activating the units of work that are parallelizable within the application as new units of work on the processor on the second processor side.

In another preferred construction, executed on a system in which the OS for single processor having a virtual storage mechanism is loaded on the processor on the first processor side and on each processor on the second processor side.

In another preferred construction, the program for parallel processing by the OS for single processor has a function for controlling the new units of work on the processors on the second processor side synchronously or asynchronously with the units of work on the processor on the first processor side.

In another preferred construction, the program for parallel processing by the OS for single processor comprises a parallel processing function for performing controls related to the units of work including the creation of the units of work, and an OS service function for providing a service for the OS for single processor to the units of work on each of the first processor side and the second processor side.

In another preferred construction, the program for parallel processing by the OS for single processor has a control processing relay function for exchanging control signals and data between the first processor side and the second processor side.

In another preferred construction, the program for parallel processing by the OS for single processor has an agent function on the first processor side associated with the units of work on the second processor side by UOW numbers to perform notification of various control signals between the units of work on the second processor side and the OS for single processor.

In another preferred construction, the parallel processing function on the second processor side creates units of work to be parallelly processed by the other processors on the second processor side.

According to another aspect of the invention, a program for parallel processing by an OS for single processor capable of operating an OS for single processor and an application on a multiprocessor and achieving parallel processing by the multiprocessor with respect to the application, having the function of, on a system in which the multiprocessor are logically divided into two groups, i.e., a first processor side and a second processor side, performing functions for operating the OS for single processor and the application on a processor on the first processor side, and functions for controlling the units of work that are parallelizable within the application as new units of work on the processor on the second processor side.

In the preferred construction, the program for parallel processing by the OS for single processor has a function for precreating the units of work that are parallelizable within the application on the processor on the second processor side.

In another preferred construction, the program for parallel processing by the OS for single processor has a function for creating and activating the units of work that are parallelizable within the application as new units of work on the processor on the second processor side.

In another preferred construction, executed on a system in which the OS for single processor having a virtual storage mechanism is loaded on the processor on the first processor side and on each processor on the second processor side.

In another preferred construction, the program for parallel processing by the OS for single processor has a function for controlling the new units of work on the processors on the second processor side synchronously or asynchronously with the units of work on the processor on the first processor side.

In another preferred construction, the program for parallel processing by the OS for single processor has a parallel processing function for performing control related to the units of work including the creation of the units of work, and an OS service function for providing a service for the OS for single processor for the units of work on the the first processor side and the second processor side respectively.

In another preferred construction, the program for parallel processing by the OS for single processor has a control processing relay function for exchanging control signals and data between the first processor side and the second processor side.

In another preferred construction, the program for parallel processing by the OS for single processor has an agent function on the first processor side associated with the units of work on the second processor side by UOW numbers to perform notification of various control signals between the units of work on the second processor side and the OS for single processor.

In another preferred construction, the parallel processing function on the second processor side creates units of work to be parallelly processed by the other processors on the second processor side.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 16 is a drawing illustrating the processing operation of the control processing relay unit in the parallel processing system according to the second embodiment.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instances, well-known structures are not shown in detail in order to not unnecessarily obscure the present invention.

In a parallel processing system of the present invention, parallel processing is executed on a multiprocessor without adding any modification to a conventional OS for single processor, by adding a mechanism that requests processing to a plurality of processors, and a mechanism for protecting critical sections in the provision of an OS service for a plurality of processors.

Below, a preferred embodiment of the present invention will be described in detail with reference to drawings.

Figure 1:
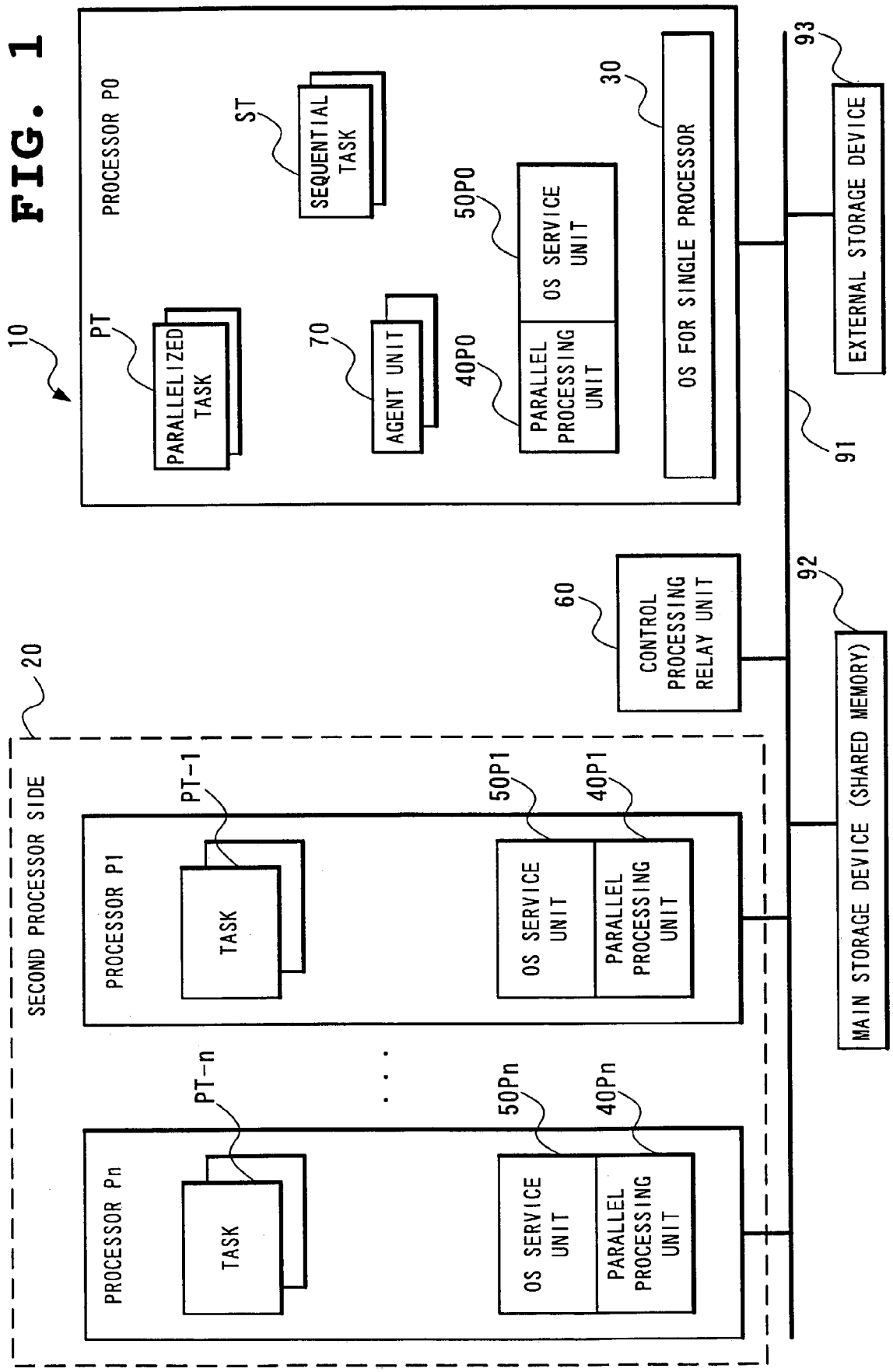
FIG. 1 is a block diagram showing the configuration of a parallel processing system according to a first embodiment of the present invention.

FIG. 1 is a block diagram showing the configuration of a parallel processing system according to the preferred embodiment of the present invention.

As shown in FIG. 1, the parallel processing system according to the present embodiment is configured by logically dividing a multiprocessor consisting of a plurality of processors (CPUs) P0-Pn (n is an integer of more than 1) connected through a system bus 91 into two groups, i.e., a first processor side 10 and a second processor side 20, implementing an OS 30 for single processor that operates on the processor P0 on the first processor side 10, and implementing parallel processing units 40 P0-40 Pn for performing parallel processing and OS service units 50 P0-50 Pn for processing OS services on each of the processor P0 on the first processor side 10 and the processors P1-Pn on the second processor side 20. A main storage device 92 as a shared memory and an external storage device 93 such as a disk device that are shared among each processor P0-Pn are also connected to the system bus 91.

In addition, the above-mentioned multiprocessor includes configurations that are provided not only with a plurality of processors of the same type, but also a plurality of processing devices of different types, such as DSPs and security engines.

Also, a control processing relay unit 60 for exchanging control signals and data between the first processor side 10 and the second processor side 20 is provided uniquely, and an agent unit 70 through which the OS 30 for single processor communicates with tasks performed on the second processor side 20 is provided on the first processor side 10.

It is not absolutely necessary that the first processor side 10 has a single processor, and it may consist of a plurality of processors. For example, a configuration is possible, in which the first processor side 10 has two processors, each of which being implemented with a different OS for single processor.

In addition, an existing OS is used as the OS 30 for single processor activated on the processor on the first processor side 10. For example, a real-time OS or a UNIX (R) OS is used as-is.

In the present specification, tasks means UOWs to perform parallel processing of processes and threads on the UNIX (R) OS, or tasks on the real-time OS.

In the parallel processing system according to the present embodiment, an application operates on the OS for single processor on the first processor side 10, among the UOWs of the application, those tasks which cannot be parallelized (sequential tasks) are processed by the processor P0 on the first processing side 10, and those tasks which can be parallelized within the application are created as new tasks on the second processor side 20 and parallelly processed.

The parallel processing unit 40 P0 and the parallel processing units 40 P1-40 Pn have functions for performing creation, activation, stop, termination, and deletion of tasks, and other controls related to tasks. Here, processing such as creation, activation, stop, termination, or deletion of a task is performed through the control processing relay unit 60, from the parallel processing unit 40 P0 on the first processor side 10 in regard to the parallel processing units 40 P1-40 Pn of each processor P1-Pn on the second processor side 20. In addition, a signal notification is processed bidirectionally from both the parallel processing unit 40 P0 and the parallel processing units 40 P1-40 Pn.

The OS service unit 50 P0 and the OS service units 50 P1-50 Pn have functions as interfaces for performing various types of access to and control over external devices, and as interfaces for performing various types of access to and control over resources shared among the tasks.

The control processing relay unit 60 is a means for exchanging control signals and data between the first processor side 10 and the second processor side 20, and is used for controlling a plurality of tasks that are parallelly processed by a plurality of processors.

The agent unit 70 is associated with tasks (in whole or in part) performed on the second processor side 20, and implemented for signal notifications (notification of various control signals for controlling tasks) between the tasks on the second processor side 20 and the OS 30 for single processor.

Below, the operation of the parallel processing system according to the present embodiment configured as described above will be described in detail with reference to drawings.

Here, the application operates on the OS for single processor on the first processor side 10, and among the UOWs of the application, those UOWs that are processed by the processor P0 on the first processor side 10 are defined as sequential tasks ST, and those UOWs which are tasks that can be parallelized within the application and are parallelly processed by the second processor side 20 as tasks PT-1-PT-n are defined as parallelized tasks PT.

Figure 2:
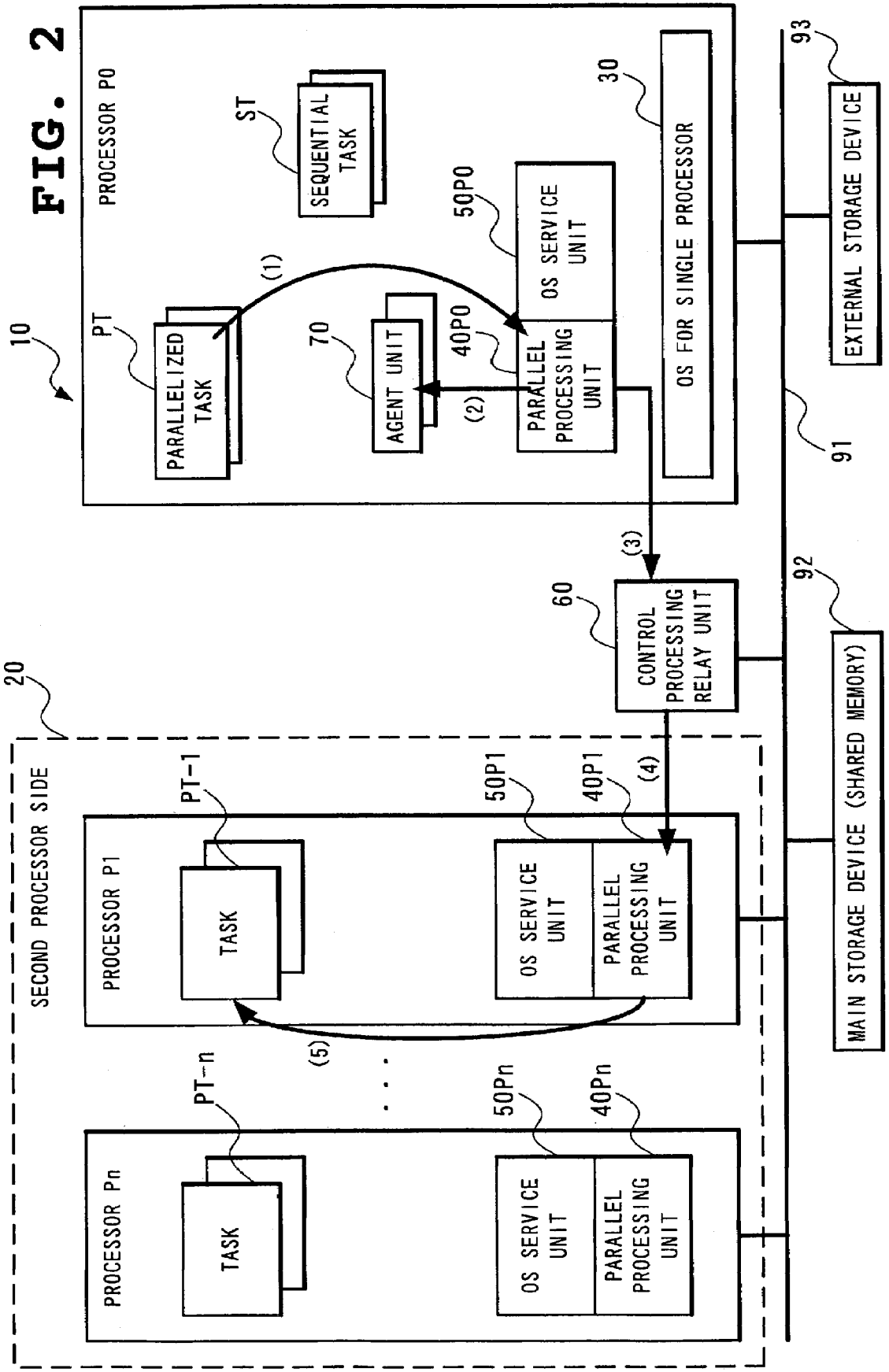
FIG. 2 is a drawing illustrating the operation of parallel processing activation by a parallel processing unit of the parallel processing system according to the first embodiment of the present invention.

First, the operation of parallel processing activation by the parallel processing units 40 P0, 40 P1-40 Pn will be described with reference to FIGS. 2 and 3.

1) When the parallelized task PT on the first processor side 10 is to be activated as any of the tasks PT-1-PT-n on the second processor side 20, a request for creating any of the tasks PT-1-PT-n as the UOW to be activated on the second processor side 20 is made to the parallel processing unit 40P.

For example, a request (command) from the parallel processing unit 40 P0 and the parallel processing units 40 P1-40 Pn includes the following: create (creation of tasks), delete (deletion of tasks), activate (activation of tasks), terminate (termination of tasks), signal (signal request), and so on. Of these, create (creation of tasks), delete (deletion of tasks), activate (activation of tasks), and terminate (termination of tasks) are the requests sent from the first processor side 10 to the second processor side 20, and signal (signal request) is sent bidirectionally between the first processor side 10 and the second processor side 20.

Figure 3:
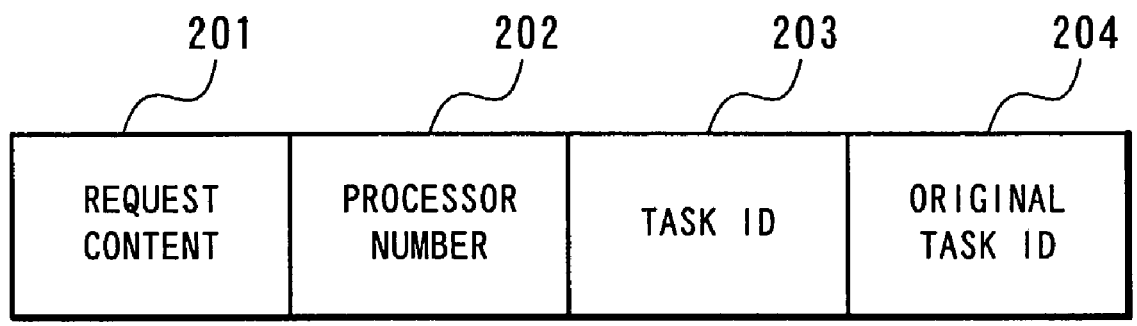
FIG. 3 is a drawing showing the configuration of a message for performing requests in the activation of parallel processing by the parallel processing unit of the parallel processing system.

This request is performed by a message as shown in FIG. 3. In other words, a task creation request is performed by sending a message to the parallel processing unit 40 P0 consisting of a request content 201 that indicates the content of the request (creation of task in this case), a processor number 202 that specifies the processor P1-Pn which is to process the task on the second processor side 20, a task number that indicates the new tasks PT-1-PT-n to be created, and an original task number that indicates the parallelized task PT requesting the creation of the task. In addition, requests other than task creation are also sent according to the message shown in FIG. 3.

2) In response to the request, the parallel processing unit 40 P0 activates the agent unit 70 corresponding to the tasks PT-1-PT-n to be created. The agent unit 70 is activated so as to prevent the task management content from being shared between the first processor side 10 and the second processor side 20, and to complete exclusive processing on the first processor side 10. At this time, the task numbers of the tasks PT-1-PT-n are held in the agent unit 70.

3) In addition, the parallel processing unit 40 P0 sets the data required to create tasks such as the above task numbers and request content (task creation on the processors P1-Pn on the second processor side 20), and the information on the reason for communication that specifies "parallel processing", in the control processing relay unit 60.

In this way, processing for setting the content of communication to a main storage device 92 (shared memory) described below, and interrupting processors is performed in regard to the control processing relay unit 60.

The information on the reason for communication is herein for indicating a recipient (acceptor) of data passed to the control processing relay unit 60, and in the above case, the data set in the control processing relay unit 60 is obtained by the parallel processing units 40 P1-40 Pn of the specified processors P1-Pn.

4) The parallel processing units 40 P1-40 Pn on the specified processors P1-Pn on the second processor side 20 obtain the information on the reason for communication, which has "parallel processing" as the request content (data required for task control), from the control processing relay unit 60.

5) The parallel processing units 40 P1-40 Pn then create and activate the tasks PT-1-PT-n on the processors P1-Pn based on the request content obtained.

In this manner, it is possible to parallelly process the UOWs of the parallelized task PT, which are the UOWs of the application operating on the OS for single processor on the first processor side 10, as the tasks PT-1-PT-n on the second processor side 20.

In addition, although a case was described in the above operation, in which the parallel processing units 40 P1-40 Pn create and activate the tasks PT-1-PT-n on the processors P1-Pn based on the request content obtained, the parallelized task PT on the first processor side 10 may be precreated as any of the tasks PT-1-PT-n on the second processor side 20, and the parallel processing units 40 P1-40 Pn may activate the tasks PT-1-PT-n on the processors P1-Pn based on the request content obtained.

Next, the OS service processing operation by the OS service units 50 P0, 50 P1-50 Pn will be described.

The OS service units 50 P0 and 50 P1-50 Pn have functions for providing services related to various types of access to and control over external devices, and various types of access to and control over resources shared with other tasks, which are services by the OS 30 for single processor, based on the requests from the tasks PT-1-PT-n created on the processors P1-Pn on the second processor side 20. The service by the OS 30 for single processor mainly handles events that are equivalent to system calls or APIs provided by a conventional OS.

Figure 4:
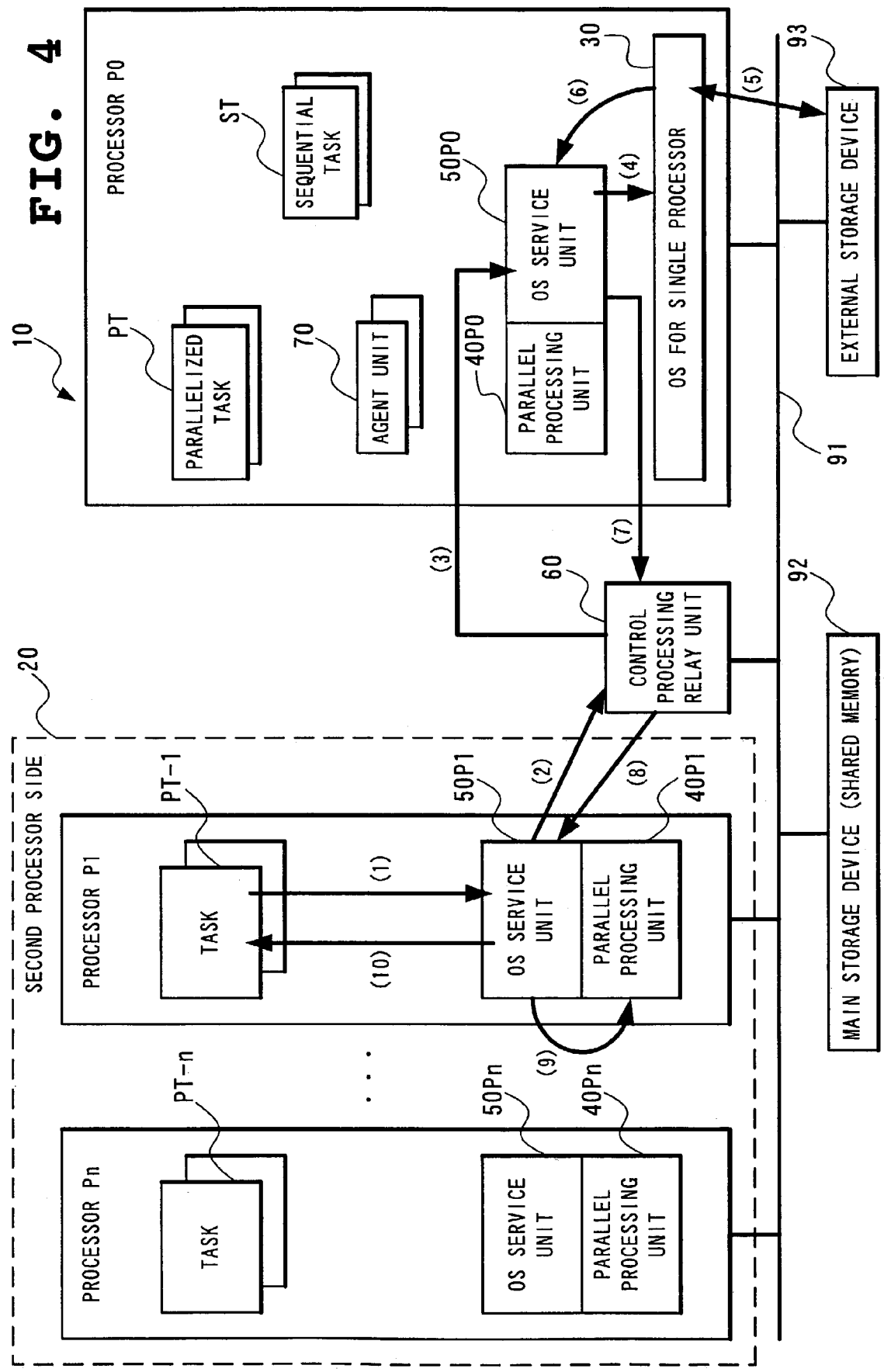
FIG. 4 is a drawing illustrating the operation of an OS service unit in regard to a file access request from a task on a second processor side in the parallel processing system according to the first embodiment.

The operation of the OS service units 50 P0 and 50 P1-50 Pn in response to a file access (e.g. various types of processing in regard to files on the external storage device 93) request from the tasks PT-1-PT-n on the processors P1-Pn on the second processor side 20 will be described with reference to FIG. 4.

Here, the file access includes processing such as open (opening of files), close (closing of files), read (reading of files), write (writing of files), seek (moving of the write position in a file), remove (removal of files), rename (renaming of files).

1) When the need for file access processing arises in the tasks PT-1-PT-n on the second processor side 20, the tasks PT-1-PT-n request a service for file access to the OS service units 50 P1-50 Pn on the second processor side 20. In the service request for file access, for example, a write function defined as a processing for writing into a file of the OS service units 50 P1-50 Pn, or a read function defined as a read processing of the files, etc., may be called.

Here, the OS service units 50 P1-50 Pn set data required for processing on the first processor side 10 (file access processing by the OS 30 for single processor). Here, the required data includes information such as the request content (e.g. write request), a descriptor of the file to be accessed (file descriptor), a pointer to a string, the length of the string, and a task number.

2) The OS service units 50 P1-50 Pn issue file access requests to the first processor side 10 by setting the required data including the request content in regard to the control processing relay unit 60 with the information on the reason for communication set to "OS service".

Thereafter, the tasks PT-1-PT-n which performed the file access service request enter a waiting state, and processing switches to other tasks by the parallel processing units 40 P1-40 Pn in the corresponding processors P1-Pn (switching of tasks).

3) The OS service unit 50 P0 on the first processor side 10 obtains the above file access request having the "OS service" of the information on the reason for communication from the control processing relay unit 60.

4) The OS service unit 50 P0 on the first processor side 10 requests for file access to the OS 30 for single processor according to the request content obtained.

5) The OS 30 for single processor thus performs file access (write, read, and so on) to the external storage device 93 based on the request. The file access processing is performed by using as-is the file access service that the OS 30 for single processor was provided with originally.

6) When the requested file access processing is completed, the OS 30 for single processor sends a return value in regard to the file access request back to the OS service unit 50 P0 on the first processor side 10, and returns the processing.

7) In addition, the OS service unit 50 P0 notifies the processors P1-Pn on the second processor side 20 of the completion of the file access, by setting the communication content, which are data including the return value and the task numbers of the tasks PT-1-PT-n that performed the file access request, on the control processing relay unit 60 with "OS service" defined as the information on the reason for communication.

8) The OS service units 50 P1-50 Pn of the corresponding processors P1-Pn receive the return value set as described above and a completion notification from the control processing relay unit 60.

9) Then, the OS services 50 P1-50 Pn on the second processor side 20 request the activation of the tasks PT-1-PT-n which performed the file access request in regard to the parallel processing units 40 P1-40 Pn.

Therefore, the processing switches to the tasks PT-1-PT-n which were in the waiting state.

10) The tasks PT-1-PT-n activated by the parallel processing units 40 P1-40 Pn receive the return value of the file access from the OS service units 50 P1-50 Pn and proceed with the processing.

Thus, the tasks PT-1-PT-n on the second processor side 20 can perform file access using the services of the OS 30 for single processor as-is, without having to provide processing units for file access on the second processor side 20 individually. In addition, since the exclusion processing for file access is completed on the first processor side 10, the parallel processing can be achieved without generating overheads due to exclusion processing such as in case the application is operated on the OS for multiprocessor.

In addition, when the tasks PT-1-PT-n on the processors P1-Pn on the second processor side 20 perform file access to read-only data on, e.g., the external storage device 93, the external storage device 93 may be accessed directly from the respective processors P1-Pn without processing by the OS service units 50 P1-50 Pn as described above.

Figure 5:
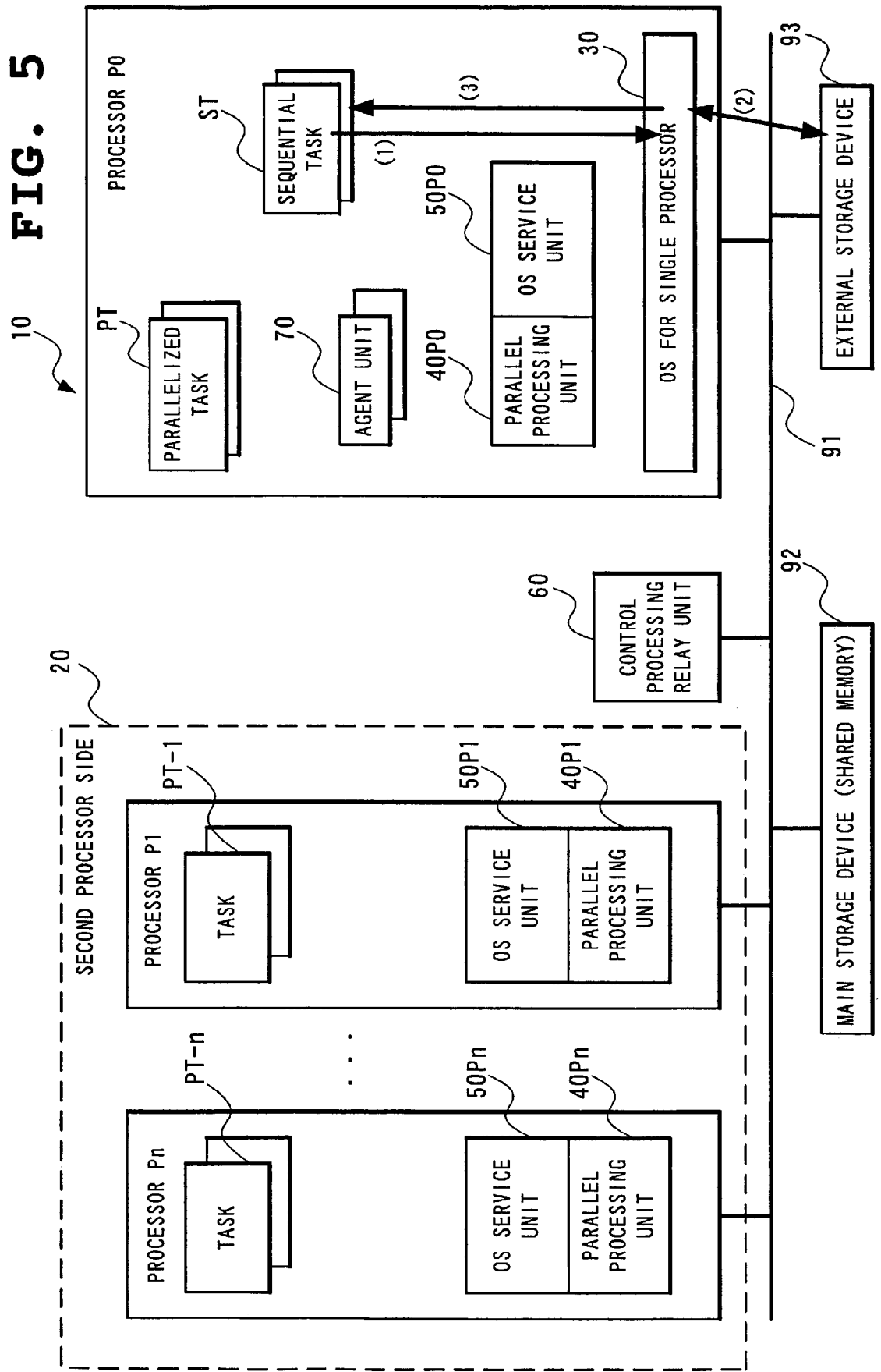
FIG. 5 is a drawing illustrating the operation in regard to a file access request from a sequential task on a first processor side.

Here, the file access request from the sequential task ST on the processor P0 on the first processor side 10 is performed directly by the OS 30 for single processor, not by the OS service unit. Below, this will be described with reference to FIG. 5.

1) The sequential task ST on the processor P0 requests the file access to the OS 30 for single processor.

2) The OS 30 for single processor then performs file access (write, read, and so on) to the external storage device 93 based on the request. The file access processing is performed by using as-is the file access service that the OS 30 for single processor was provided with originally.

3) When the file access processing is completed, the OS 30 for single processor returns a return value regarding the file access request to the sequential task ST, and returns the processing.

Since exclusion control is unnecessary in regard to OS service requests from the sequential task ST, extra overheads do not occur.

The processing operation by the control processing relay unit 60 will be described with reference to FIGS. 6 and 7.

Figure 6:
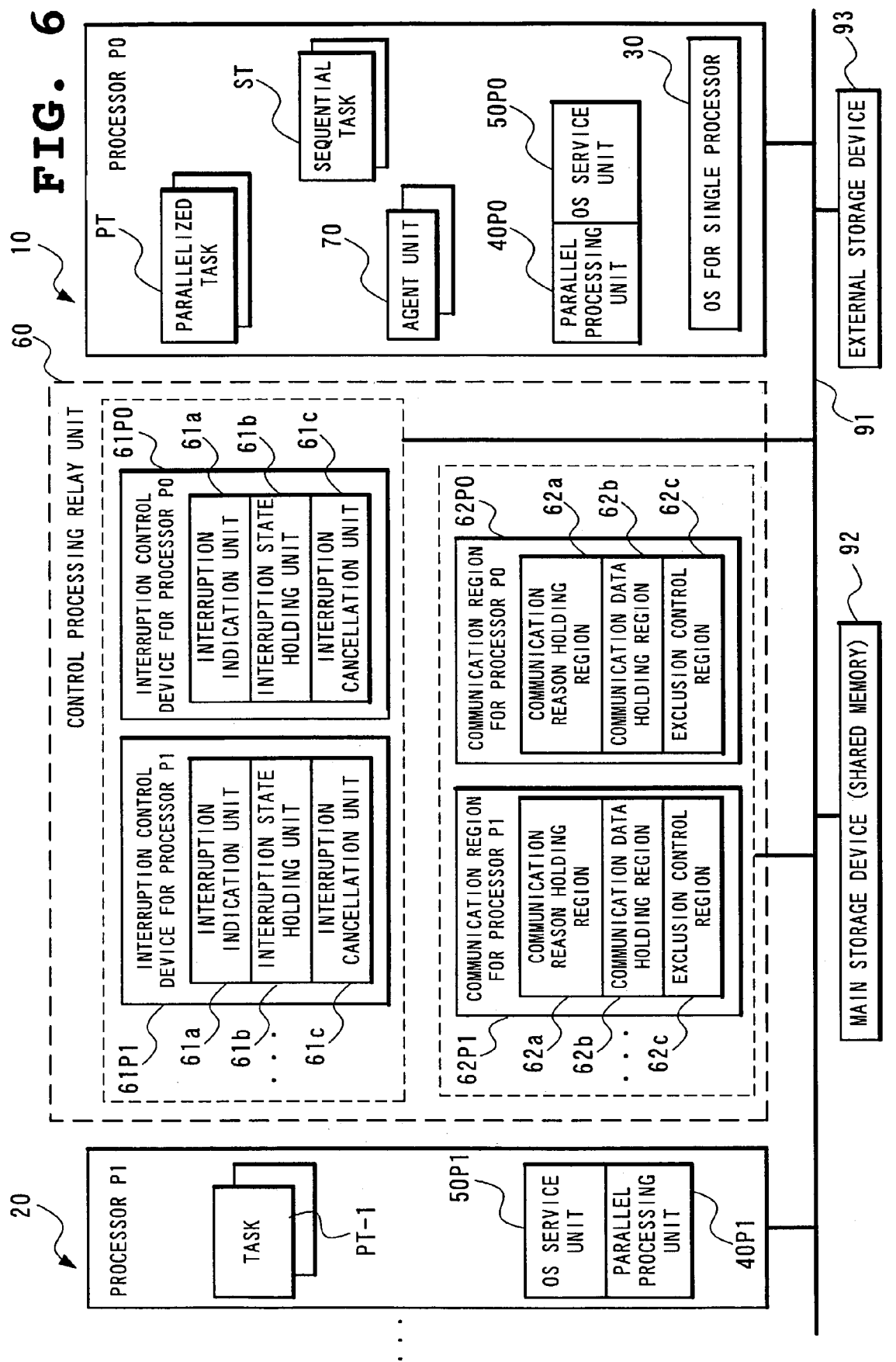
FIG. 6 is a block diagram showing the inner configuration of a control processing relay unit in the parallel processing system according to the first embodiment.
Figure 7:
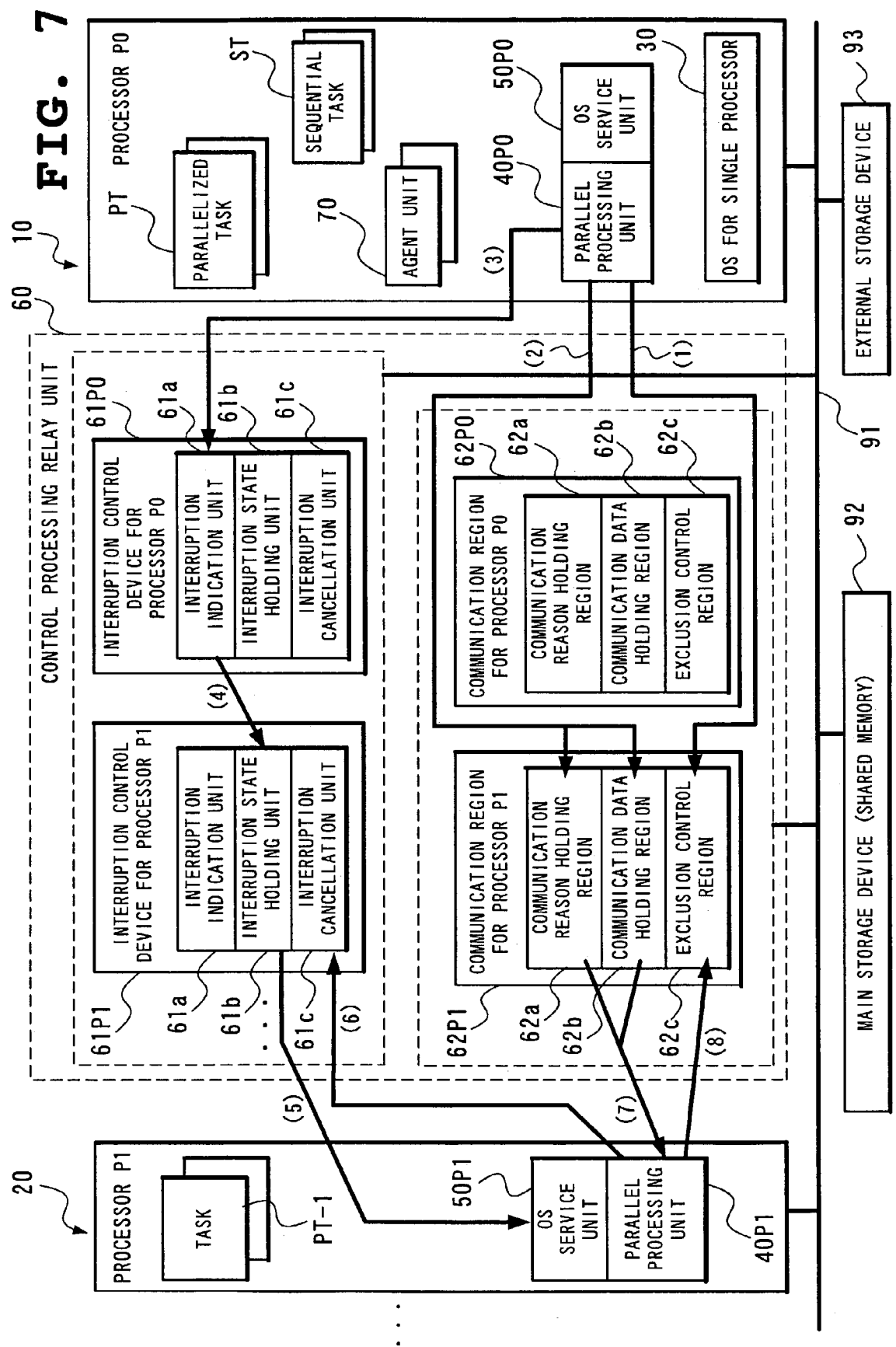
FIG. 7 is a drawing illustrating the processing operation of the control processing relay unit in the parallel processing system according to the first embodiment.

First, the configuration of the control processing relay unit 60 is shown in FIG. 6. As illustrated, the control processing relay unit 60 is configured by the provision of interruption control devices 61 P0-61 Pn corresponding to the respective processors P0-Pn, and communication regions 62 P0-62 Pn corresponding to the respective processors P0-Pn. Here, the communication regions 62 P0-62 Pn are stored in the main storage device 92.

In addition, interruption devices 61 P0-61 Pn are configured by an interruption instruction unit 61a that instructs the other processors to interrupt, an interruption state holding unit 61b that holds the information that there was an interruption due to an interruption instruction, and an interruption cancellation unit 61c that clears the interruption.

In addition, the communication regions 62 P0-62 Pn are configured by a communication reason holding region 62a that holds the information on the reason for communication from a communicating processor, a communication data holding region 62b that holds communication data for communication, and an exclusion control region 62c that locks the communication region for securing the communication.

At this point, in the communication data holding region 62b a pointer to the main storage device 92 is stored, in which the communication data (a required data that includes the request content) to be communicated is stored.

As an example, the operation of the communication processing from the parallel processing unit 40 P0 on the first processor side 10 to the processor P1 on the second processor side 20 will be described with reference to FIG. 7.

1) The parallel processing unit 40 P0 locks the exclusion control region 62c of the communication region 62 P1 for the processor P1. Specifically, setting a lock variable stored in the exclusion control region 62c into the locked state prevents the communication region 62 P1 for the processor P1 from being used by other processors.

If a lock was already set by another processor, there is a wait until the lock is released.

2) When the locking of the communication region 62 P1 is obtained, the parallel processing unit 40 P0 stores the information on the reason for communication and the communication data (a required data that includes the request content) respectively in the communication reason holding region 62a and the communication data holding region 62b of the communication region 62 P1.

As information on the reason for communication to be stored, if the communication processing is for task creation as mentioned above, information indicating "parallel processing" (e.g. predetermined data such as a numeric value corresponding to parallel processing) is stored.

3) The parallel processing unit 40 P0 instructs the interruption instruction unit 61a of its interruption control device 61 P0 to interrupt the processor P1.

4) The interruption instruction unit 61a of the interruption control device 61 P0 sets the information indicating the interruption in the interruption state holding unit 61b of the interruption control device 61 P1 corresponding to the processor P1. Thus, the processor P1 becomes interrupted.

5) The parallel processing unit 40 P1 of the processor P1 determines that interruption was set based on the status of the interruption state holding unit 61b of the interruption control device 61 P1 of the control processing relay unit 60.

6) The parallel processing unit 40 P1 of the processor P1 releases itself from its interrupted state by clearing the interruption information of its interruption state holding unit 61b of the control processing relay unit 60.

7) The parallel processing unit 40 P1 of the processor P1 obtains the information on the reason for communication and the communication data (a required data that includes the request content) respectively from the communication reason holding region 62a and the communication data holding region 62b of its communication region 62 P1 of the control processing relay unit 60.

8) The parallel processing unit 40 P1 of the processor P1 unlocks the exclusion control region 62c of its communication region 62 P1 after it has become capable of receiving the next communication. Specifically, by setting the lock variable stored in the exclusion control region 62c to the unlock state, the communication region 62 P1 for the processor P1 is released so that it may be used by the other processors.

Thus, using the control processing relay unit 60, exchange of control signals and data between the first processor side 10 and the second processor side 20 is achieved.

Figure 8:
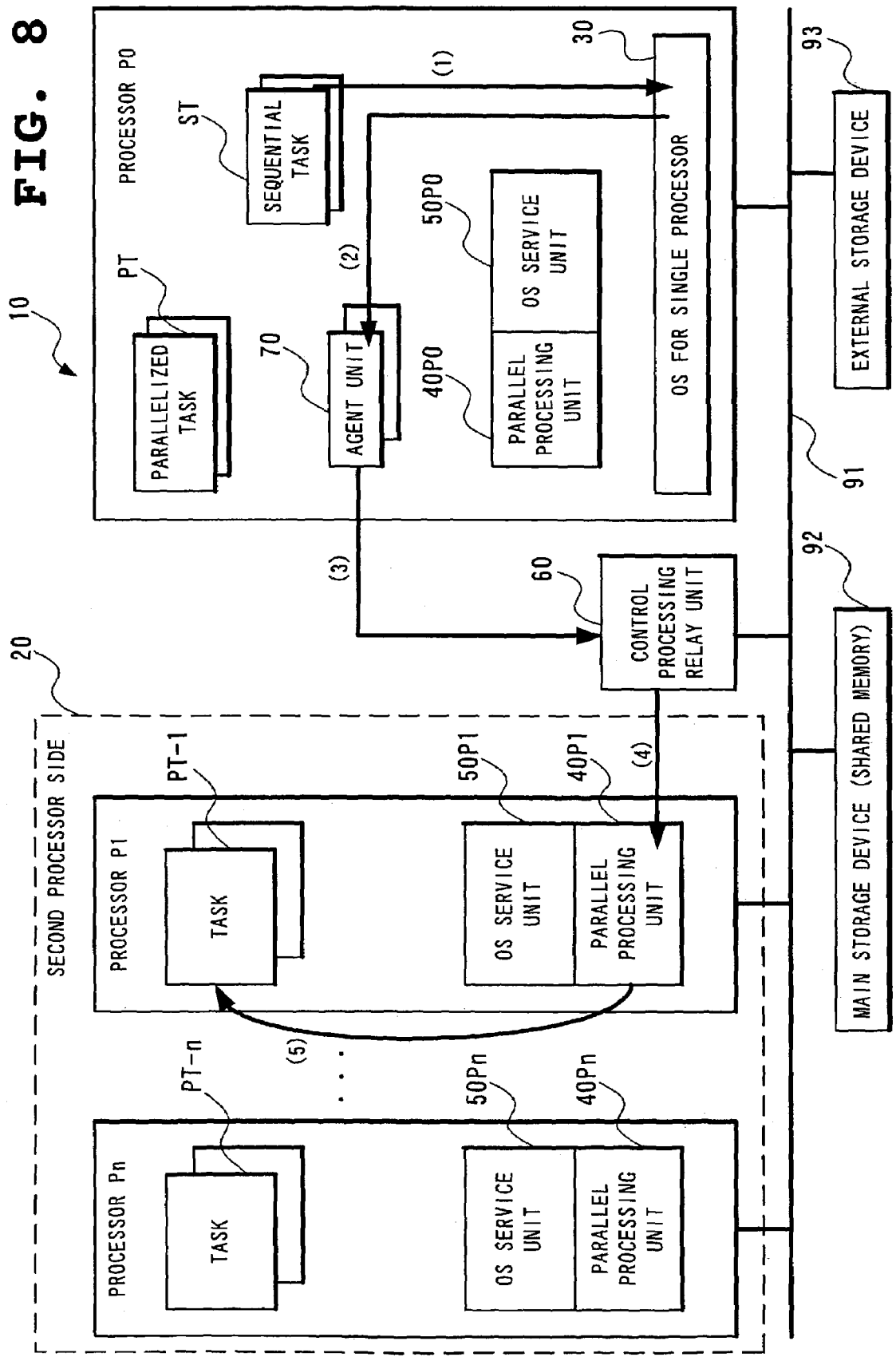
FIG. 8 is a drawing illustrating signal notification processing operation by an agent unit in the parallel processing system according to the first embodiment.

The operation of signal notification processing by the agent unit 70 will be described with reference to FIG. 8.

The agent unit 70 has functions whereby the OS 30 for single processor communicates via a signal (control signal) with the tasks PT-1-PT-n generated on the second processor side 20. The task numbers of the tasks PT-1-PT-n, which are to be handled, are held in the agent unit 70.

In addition, the agent unit 70 may be associated with a plurality of tasks PT-1-PT-n in a one-to-one relationship, or a plurality of tasks PT-1-PT-n may be associated with the agent unit 70 in a one-to-many relationship.

1) The sequential task ST on the first processor side 10 requests a signal notification service to the OS 30 for single processor. The signal communicated by the signal notification is a control signal for controlling the tasks PT-1-PT-n activated on each processor P1-Pn on the second processor side 20 via a service function which the OS 30 for single processor possesses originally.

2) The OS 30 for single processor notifies the agent unit 70 of the signal.

3) Through the control processing relay unit 60, the agent unit 70 notifies the notified signal to the processors P1-Pn which are to handle it and in which the task PT-1 exists, on the second processor side 20. At this point, "parallel processing" is set as the information on the reason for communication.

4) Since the information on the reason for communication to the control processing relay unit 60 is "parallel processing", the parallel processing units 40 P1-40 Pn of the handling processors on the second processor side 20 obtain a signal notification request from the control processing relay unit 60.

5) The parallel processing units 40 P1-40 Pn that obtained the signal notification request notify the handling tasks PT-1-PT-n of the signal (control signal).

Thus, since the agent unit 70 is associated with the tasks PT-1-PT-n on the processors P0-Pn on the second processor side 20 by the task numbers, on the first processor side 10, the signal notification service by the OS 30 for single processor can be performed with respect to the tasks PT-1-PT-n.

Finally, inter-task cooperative operation on the second processor side 20 will be described with reference to FIGS. 9 and 10.

Figure 9:
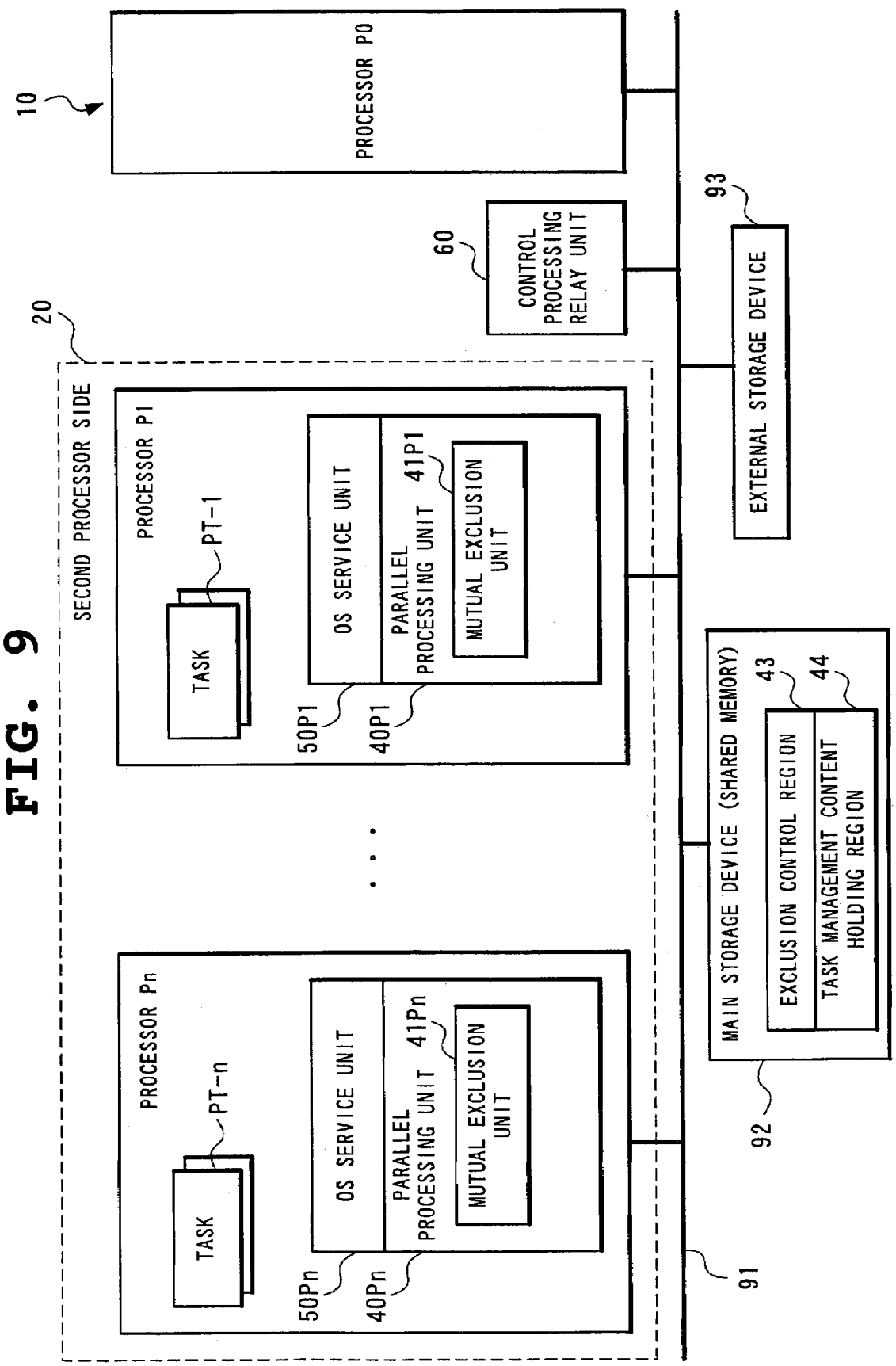
FIG. 9 is a block diagram showing a configuration for achieving inter-task cooperative operation on the second processor side in the parallel processing system according to the first embodiment.
Figure 10:
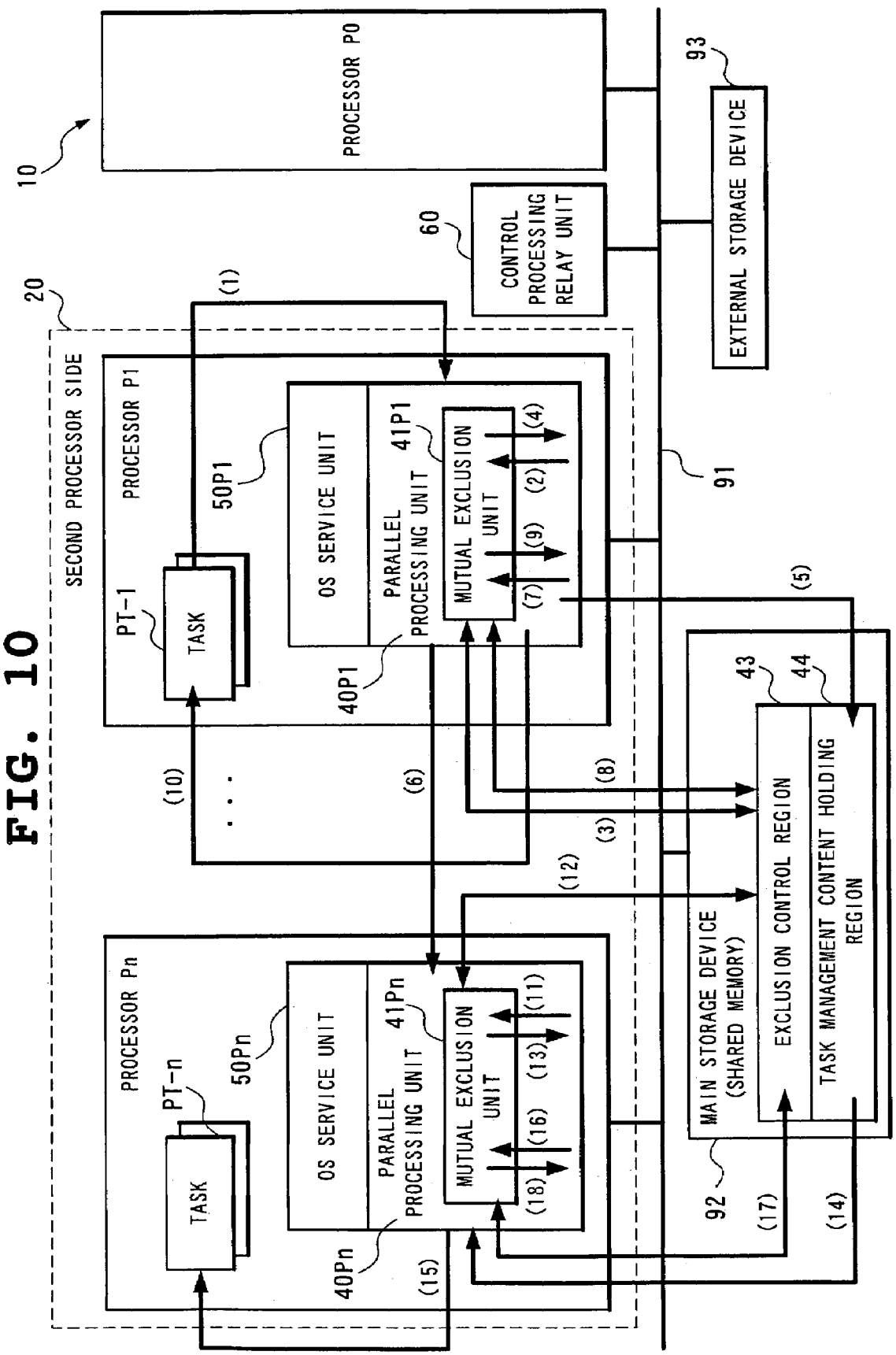
FIG. 10 is a drawing illustrating the inter-task cooperative operation on the second processor side in the parallel processing system according to the first embodiment.

FIG. 9 shows the configuration of the parallel processing units 40 P1-40 Pn for obtaining cooperation among the tasks. As illustrated, the parallel processing units 40 P1-40 Pn are provided with mutual exclusion units 41 P1-41 Pn.

The main storage device 92 also includes an exclusion control region 43 and a task management content holding region 44 to obtain task cooperation.

1) The task PT-1 on the processor P1 requests the desired parallel processing to its parallel processing unit 40 P1.

2) The parallel processing unit 40 P1 of the processor P1 requests a lock acquisition to the mutual exclusion unit 41 P1 to secure the resources that are to be used for parallel processing.

3) The mutual exclusion unit 41 P1 obtains the lock using the exclusion control region 43 of the main storage device 92.

4) The mutual exclusion unit 41 P1 notifies the parallel processing unit 40 P1 that the lock could be obtained.

5) The parallel processing unit 40 P1 holds, in the task management content holding region 44, the management content (request content, task number, and other required data) of the task PT-1 that requested parallel processing on the processor P1.

6) The parallel processing unit 40 P1 interrupts the other processors P2-Pn that are executing low-priority tasks. Here, it is supposed that the processor Pn is interrupted.

7) The parallel processing unit 40 P1 requests to the mutual exclusion unit 41 P1, the release of the lock secured as described above.

8) The mutual exclusion unit 41 P1 unlocks the exclusion control region 43 of the main storage device 92.

9) The mutual exclusion unit 41 P1 notifies the parallel processing unit 40 P1 of the completion of the unlocking.

10) The parallel processing unit 40 P1 returns the processing to the task PT-1.

11) The parallel processing unit 40 Pn of the processor Pn requests a lock acquisition to the mutual exclusion unit 41 Pn to secure the resources that are to be used for parallel processing.

12) The mutual exclusion unit 41 Pn obtains the lock using the exclusion control region 43 of the main storage device 92.

13) The mutual exclusion unit 41 Pn notifies the parallel processing unit 40 Pn that the lock acquisition is completed.

14) The parallel processing unit 40 Pn obtains the task management content stored in the task management content holding region 44.

15) The parallel processing unit 40 Pn creates and activates a new task based on the task management content.

16) The parallel processing unit 40 Pn requests to the mutual exclusion unit 41 Pn, the release of the lock secured as described above.

17) The mutual exclusion unit 41 Pn unlocks the exclusion control region 43 of the main storage device 92.

18) The mutual exclusion unit 41 Pn notifies the parallel processing unit 40 Pn of the completion of the unlocking.

Such a task cooperation operation allows the tasks PT-1-PT-n activated on the processors P1-Pn to have their own UOWs parallelly processed by the other processors.

In applications in the parallel processing system configured as above, for example, an application that operates on a mobile terminal of a multiprocessor will be described.

Figure 11:
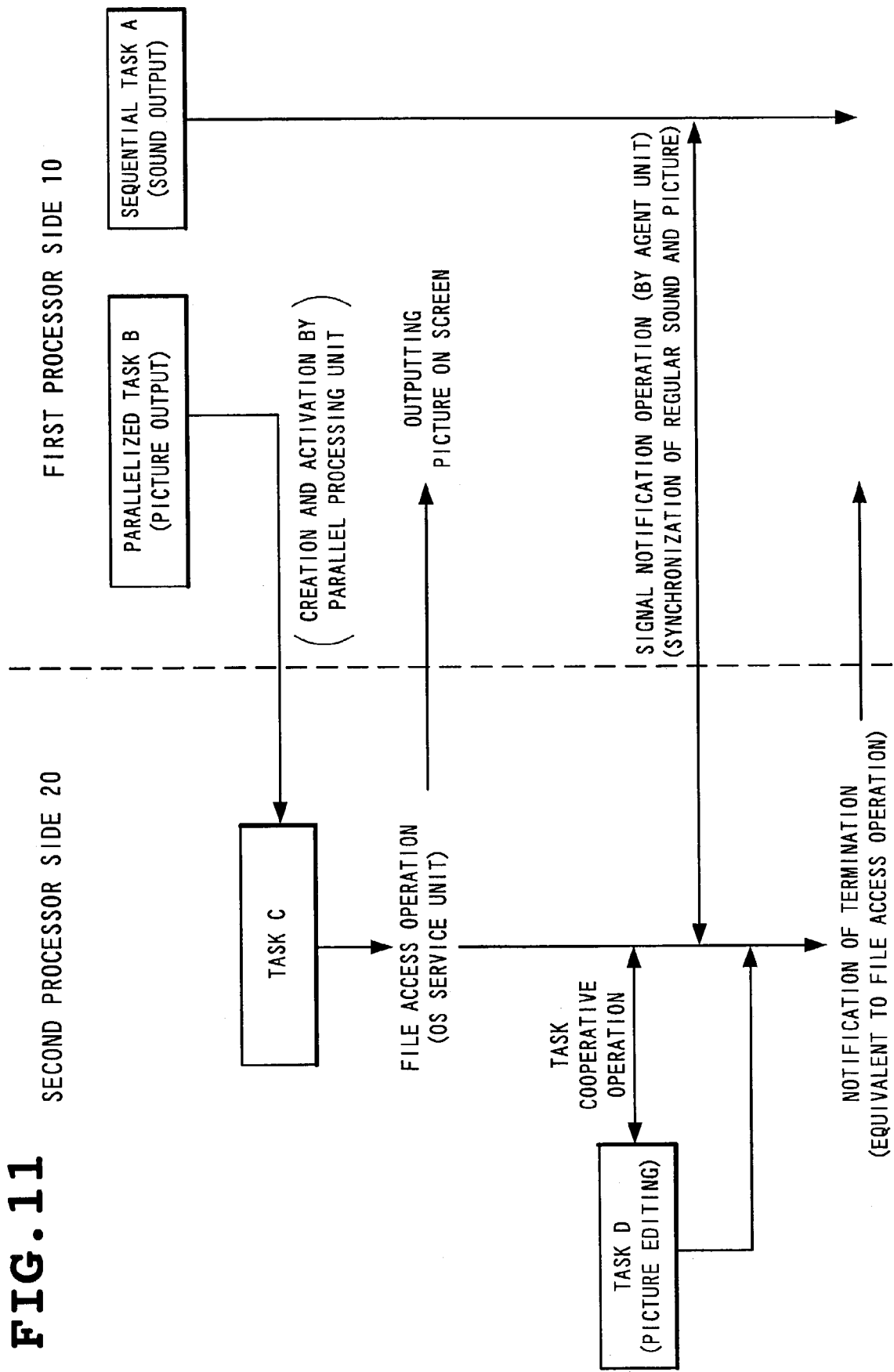
FIG. 11 is a drawing illustrating an example of a case in which an application is operated on a mobile terminal with a multiprocessor as an example of application of the parallel processing system.

Here, a case will be described with reference to FIG. 11, in which it is assumed that the application has the functions of playing a picture (animation) and sound simultaneously on a mobile terminal, the sound output processing being defined as a sequential task A, and the picture output processing being defined as a parallelized task B, and is operated on the processor P0 on the first processor side 10.

The parallelized task B is created and activated as a task C on any of the processors P1-Pn on the second processor side 20 by the above parallel processing unit.

The created task C outputs the picture on a screen via file access processing of the OS service unit.

Concerning the sound output by the sequential task A, the sound is outputted by the service of the single task OS 30.

In case the sound and the picture are to be synchronized periodically, synchronization is achieved by performing signal notification between the sequential task A and the task C through the operation of signal notification by the agent unit 70.

In addition, when the picture is edited in the task C, an edit processing is created and activated as a task D on another processor by task cooperative processing.

When the picture output processing by the task C is completed, the task C notifies the OS for single processor of the termination via the file access operation.

In the present embodiment, by implementing the parallel processing units 40 P0-40 Pn, the OS service units 50 P0-50 Pn, the control processing relay unit 60, and the agent unit 70 as modules, the OS 30 and the application for single processor can be operated without overheads on a multiprocessor system configuration without modifying the applications operated on the OS 30 for single processor and the processor P0, and at the same time, benefits arising from the parallel processing by the multiprocessor can be obtained.

Figure 12:
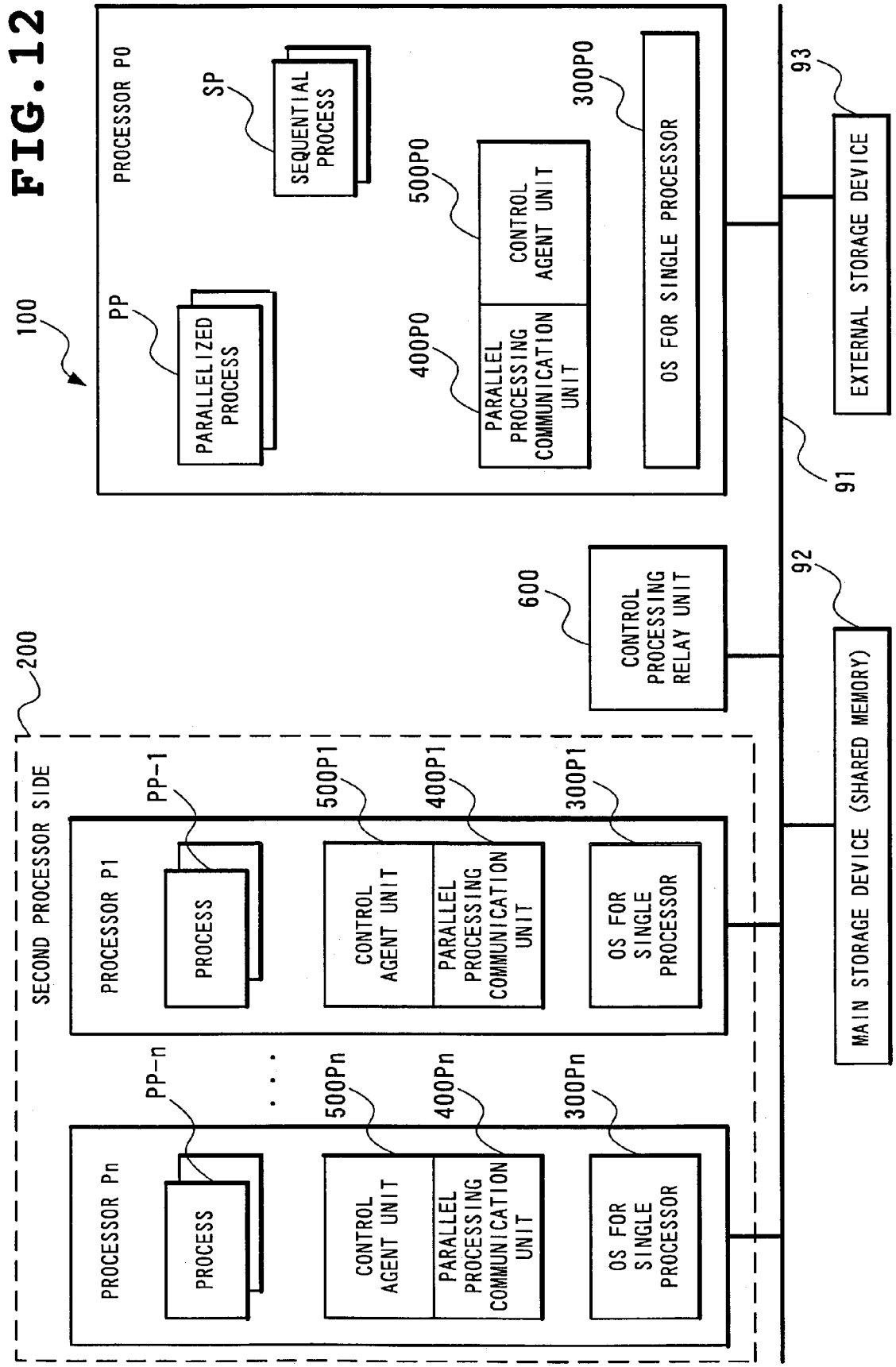
FIG. 12 is a block diagram showing the configuration of a parallel processing system according to a second embodiment of the present invention.

Next, a parallel processing system according to a second embodiment of the present invention will be described with reference to FIG. 12 or greater. FIG. 12 is a block diagram showing the configuration of the parallel processing system according to the second embodiment, in which components that are common to FIG. 1 are referenced by the same numerals. In the second embodiment shown in FIG. 12, a case is shown, in which the parallel processing units 40 P0-40 Pn in the first embodiment consist of parallel processing communication units 400 P0-400 Pn and control agent units 500 P0-500 Pn respectively.

As shown in FIG. 12, the parallel processing system according to the present embodiment is similar to the first embodiment on the point that a multiprocessor consisting of a plurality of processors (CPU) P0-Pn (n is an integer of more than 1) connected through a system bus 91 is logically divided into two groups, i.e., a first processor side 100 and a second processor side 200.

In the second embodiment, OSes 300 P0-300 Pn for single processor are implemented which operate on the processor P0 on the first processor side 100 and each processor of the processors (CPU) P0-Pn on the second processor side 200.

In addition, parallel processing communication units 400 P0-400 Pn for parallel processing and control agent units 500 P0-500 Pn are implemented on the processor P0 on the first processor side 100 and the processors P1-Pn on the second processor side 200 respectively. A main storage device 92 as a shared memory and an external storage device 93 such as a disk device that are shared among each processor P0-Pn, are also connected to the system bus 91.

Also, a control processing relay unit 600 is uniquely provided for exchanging control signals and data between the first processor side 100 and the second processor side 200.

In addition, regarding the agent unit 70 shown in the first embodiment through which the OS 300 P0 for single processor on the first processor side 100 communicates with processes performed by the second processor side 200, since it performs functions that are absolutely identical to the first embodiment, its description is omitted from the present embodiment for the sake of convenience.

In addition, it was described in the first embodiment that the switching of tasks was performed in response to the file access request from the tasks on the processors PT-1-PT-n on the second processor side 20. File access from the second processor side 200 is also possible in the present embodiment, and the switch of processes PP-1-PPn on the second processor side 200 is performed by the OSes 300 P1-300 Pn for single processor on the second processor side 200.

Regarding the OSes 300 P0-300 Pn for single processor implemented on the each processor P0-Pn, there is a difference with the first embodiment on the point that not only OSes that do not have a virtual storage mechanism which achieves a memory protection function such as real-time OSes, but OSes that have a virtual storage mechanism such as Linux, Windows (R), and so on, which are existing OSes can also be used, such that a memory protection mechanism can be achieved on all or part of each processor P0-Pn.

In addition, the OSes 300 P0-300 Pn for single processor need not be the same type of OS, but may be different types of OS from each other.

In the present embodiment, the task, which is a UOW for performing parallel processing, being memory protected between each processor, is referred to as a process, to distinguish from the task in the first embodiment.

In the parallel processing system according to the present embodiment, among the UOWs of an application operating on the OS 300 P0 for single processor on the first processor side 100, those processes which cannot be parallelized (sequential processes SP) are processed by the processor P0 on the first processing side 100, and those tasks which can be parallelized within the application are created as new processes PP-1-PP-n on the second processor side 200 and parallelly processed.

The parallel processing communication unit 400 P0 and the parallel processing communication units 400 P1-400 Pn have functions for passing process creation, activation, stop, termination, deletion and other control information related to processes, between the processes and the OSes 300 P0-300 Pn for single processor.

Here, control information and data related to creation, activation, stop, termination, deletion or the like of tasks are exchanged through the control processing relay unit 600 between the first processor side 100 and the second processor side 200.

In addition, the control agent unit 500 P0 and the control agent units 500 P1-500 Pn have functions to obtain processing requests from the OSes 300 P0-300 Pn for single processor to the process, and activate the process.

The control processing relay unit 600 is a means for exchanging control signals and data between the first processor side 10 and the second processor side 20, and is used for controlling a plurality of processes that are parallelly processed by a plurality of processors.

Below, the operation of the parallel processing system according to the second embodiment configured as described above will be described in detail below with reference to drawings.

Here, the application operates on the OS 300 P0 for single processor on the first processor side 100, and among the UOWs of the application, those UOWs that are processed by the processor P0 on the first processor side 100 are defined as sequential processes SP, and those UOWs which are processes that can be parallelized within the application, and are parallelly processed by the second processor side 200 as tasks PP-1-PP-n are defined as parallelized processes PP.

In the second embodiment, after a process (task) is activated, synchronous activation of parallel processing in which a parallelized process PP that is a process (task) on the calling side waits for the asynchronous activation of parallel processing in which a parallelized process PP that is a process (task) on the calling side need not wait for the termination of the activated processes PP-1-PP-n, are possible.

Figure 13:
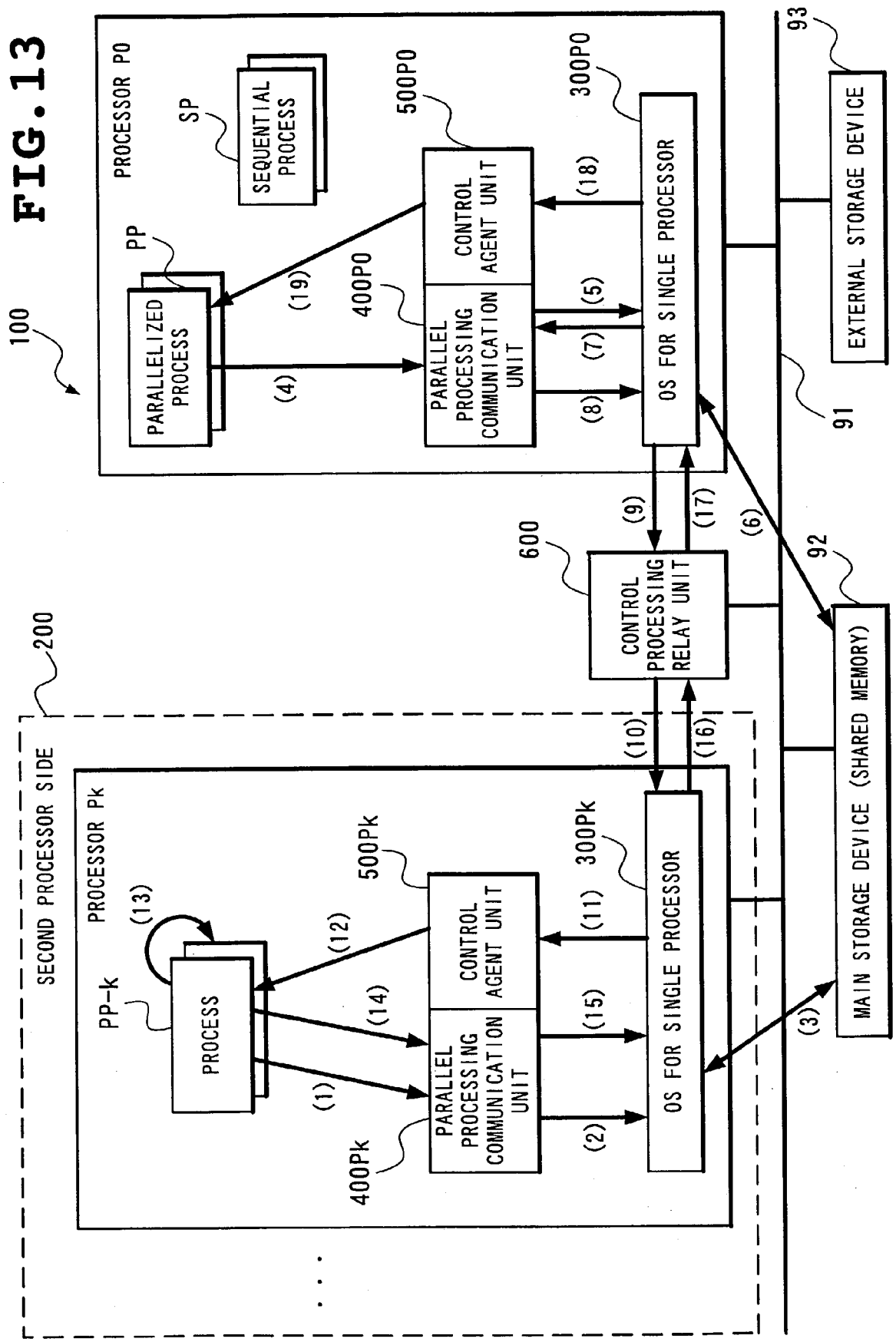
FIG. 13 is a drawing illustrating the synchronous operation of parallel processing activation of processes in the parallel processing system according to the second embodiment.

First, the operation for the synchronous activation of parallel processing of process will be described with reference to FIG. 13.

Here, the parallelized process PP on the first processor side 100 is precreated as a process PP-k which is a UOW that is activated on the second processor side 200 in a processor Pk ($1 \leq k \leq n$) on the second processor side 200.

1) The process PP-k on the processor Pk ($1 \leq k \leq n$) on the second processor side 200 records in a parallel processing communication unit 400 Pk, the information on the processing associated with its process. Thus, the process PP-k is in the standby state.

2) The parallel processing communication unit 400 Pk performs request for accessing the required data on the main storage device 92 (shared memory) through the OS 300 Pk for single processor.

3) Thus, the information on processing associated with the process PP-k is stored in the main storage device 92 (shared memory).

4) The process PP on the processor P0 requests synchronous processing to the parallel processing communication unit 400 P0. Thereafter, the process PP enters the standby state.

5) The parallel processing communication unit 400 P0 which received the request performs a request to access data on the main storage device 92 (shared memory) through the OS 300 P0 for single processor.

6) The main storage device 92 (shared memory) is accessed by the OS 300 P0 for single processor.

7) The parallel processing communication unit 400 P0 obtains the information on processing associated with the process PP-k from the main storage device 92 (shared memory). Thus, a processor number and a process number for performing the process PP-k are obtained.

8) The parallel processing communication unit 400 P0 requests a communication request based on the information obtained from the main storage device 92 (shared memory) through the OS 300 P0 for single processor.

9) The OS 300 P0 for single processor sets the information required for communication in the control processing relay unit 600.

10) Thus, a processing request is sent from the control processing relay unit 600 to the OS 300 Pk for single processor of the processor Pk.

11) The control agent unit 500 Pk of the processor Pk obtains the processing request sent through the OS 300 Pk for single processor.

12) Then, the control agent unit 500 Pk activates the process PP-k according to the processing request obtained.

13) Thus, the process PP-k which was in the standby state performs the processing.

14) After the processing has finished, the process PP-k notifies the parallel processing communication unit 400 Pk of this information.

15) The parallel processing communication unit 400 Pk that received the notification requests a communication request based on the information that was notified through the OS 300 Pk for single processor.

16) The OS 300 Pk for single processor sets the information required for communication in the control processing relay unit 600.

17) Thus, the processing request is sent from the control processing relay unit 600 to the OS 300 P0 for single processor of the processor P0.

18) The control agent unit 500 P0 of the processor P0 obtains the processing request sent through the OS 300 P0 for single processor.

19) Then, the control agent unit 500 P0 activates the process PP according to the processing request obtained.

Thus, synchronous processing is achieved between the process PP on the processor P0 on the first processor side 100 and the processor PP-k on the second processor side 200.

Figure 14:
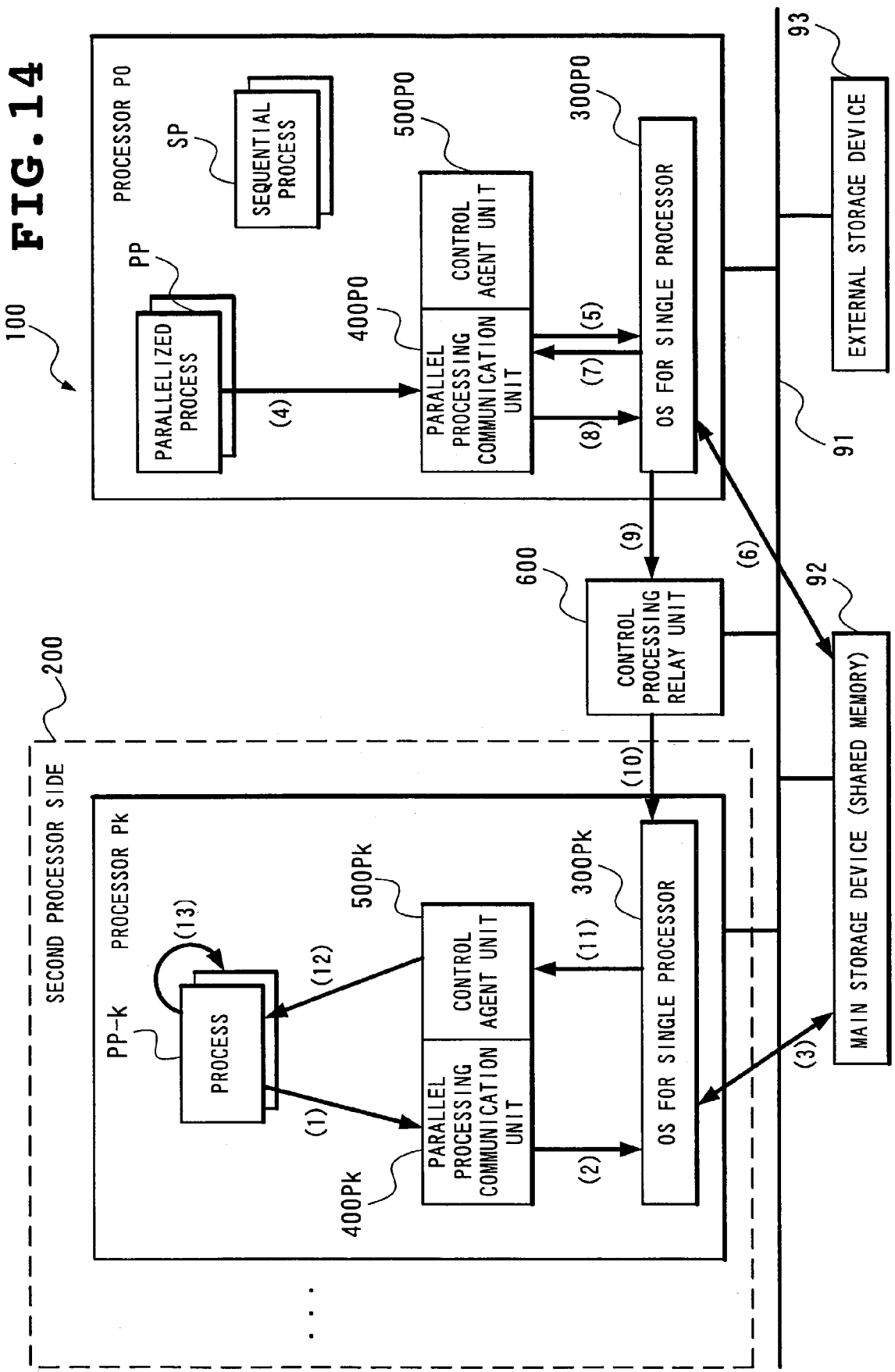
FIG. 14 is a drawing illustrating the asynchronous operation of parallel processing activation of processes in the parallel processing system according to the second embodiment.

Next, the operation for the asynchronous activation of parallel processing of process will be described with reference to FIG. 14.

Here also, the parallelized process PP on the first processor side 100 is precreated as a process PP-k which is a UOW that is activated on the second processor side 200 in a processor Pk ($1 \leq k \leq n$) on the second processor side 200.

1) The process PP-k which was performing the processing on the processor Pk ($1 \leq k \leq n$) on the second processor side 200 records in a parallel processing communication unit 400 Pk, the information on the processing associated with its process. Thus, the process PP-k enters a standby state.

2) The parallel processing communication unit 400 Pk performs request for accessing the required data on the main storage device 92 (shared memory) through the OS 300 Pk for single processor.

3) Thus, the information on processing associated with the process PP-k is stored in the main storage device 92 (shared memory).

4) The process PP on the processor P0 requests asynchronous processing to the parallel processing communication unit 400 P0. In this case, the process PP continues processing without entering the standby state.

5) The parallel processing communication unit 400 P0 which received the request performs a request to access data on the main storage device 92 (shared memory) through the OS 300 P0 for single processor.

6) The main storage device 92 (shared memory) is accessed by the OS 300 P0 for single processor.

7) The parallel processing communication unit 400 P0 obtains the information on processing associated with the process PP-k from the main storage device 92 (shared memory). Thus, a processor number and a process number for performing the process PP-k are obtained.

8) The parallel processing communication unit 400 P0 requests a communication request based on the information obtained from the main storage device 92 (shared memory) through the OS 300 P0 for single processor.

9) The OS 300 P0 for single processor sets information required for communication in the control processing relay unit 600.

10) Thus, the processing request is sent from the control processing relay unit 600 to the OS 300 Pk for single processor of the processor Pk.

11) The control agent unit 500 Pk of the processor Pk obtains the processing request sent through the OS 300 Pk for single processor.

12) The control agent unit 500 Pk activates the process PP-k according to the processing request obtained.

13) Thus, the process PP-k which was in the standby status performs the processing.

Thus, asynchronous processing is achieved between the process PP on the processor P0 on the first processor side 100 and the processor PP-k on the second processor side 200.

In addition, the processing operation by the control processing relay unit 600 in the parallel processing system according to the second embodiment will be described with reference to FIGS. 15 and 16.

Figure 15:
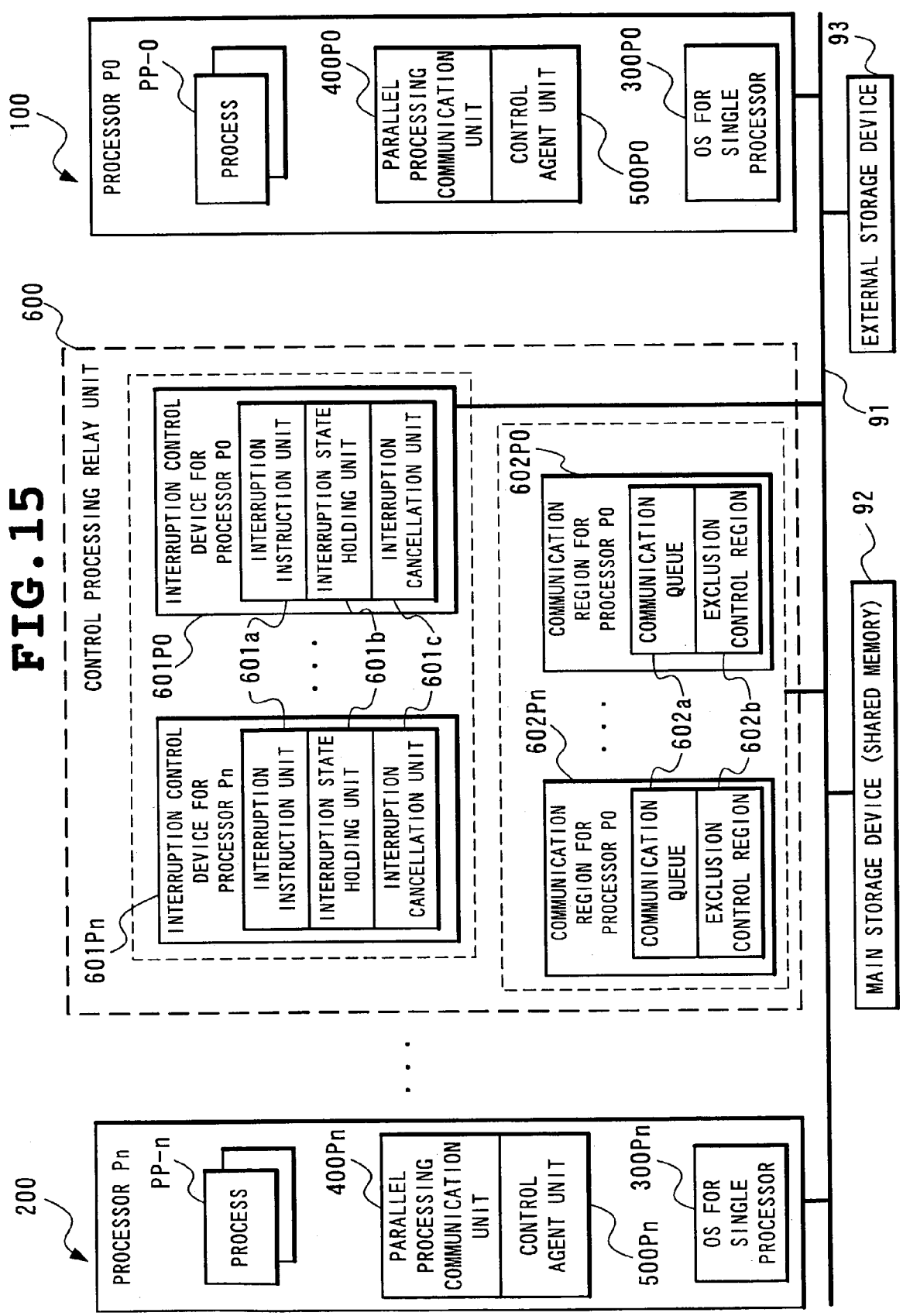
FIG. 15 is a block diagram showing the inner configuration of a control processing relay unit in the parallel processing system according to the second embodiment.

First, the configuration of the control processing relay unit 600 is shown in FIG. 15. As illustrated, the control processing relay unit 600 is configured by the provision of interruption control devices 601 P0-601 Pn corresponding to the respective processors P0-Pn, and communication regions 602 P0-602 Pn corresponding to the respective processors P0-Pn. Here, the communication regions 602 P0-602 Pn are stored in the main storage device 92.

The interruption control devices 601 P0-601 Pn have the same configuration as the control processing relay unit 60 in the first embodiment shown in FIG. 6, and consist of an interruption instruction unit 601a, an interruption state holding device 61b, and an interruption cancellation unit 601c.

Also, communication regions 602 P0-602 Pn basically have the same configuration as in the first embodiment shown in FIG. 6, and consist of a communication queue 602a formed by combining the communication reason holding region 62a with the communication data holding region 62b shown in FIG. 6, and an exclusion control region 602c.

As an example, the operation of the communication processing from the parallel processing communication unit 400

P0 on the first processor side 100 to the processor Pn on the second processor side 20 will be described with reference to FIG. 16.

1) The parallel processing communication unit 400 P0 locks the exclusion control region 602b of the communication region 602 Pn for processor P1. Specifically, setting a lock variable stored in the exclusion control region 602b into a lock state prevents the communication region 602 Pn for the processor Pn from being used in the other processors.

2) The parallel processing communication unit 400 P0 stores the information on the reason for communication and the communication data (a required data that includes the request content) in the communication queue 602a of the communication region 602 Pn.

As information on the reason for communication to be stored, if the communication processing is one for process creation/activation as mentioned above, information indicating "activation of processing" (e.g. predetermined data such as a numeric value corresponding to the parallel processing) is stored.

3) At the time point of 1), if the communication queue 602a of the communication region 602 Pn is empty, the parallel processing communication unit 400 P0 instructs the interruption instruction unit 601a of its interruption control device 601 P0 to interrupt the processor Pn.

4) The parallel processing communication unit 400 P0 of the processor P0 sets the exclusion control region 602b of the communication region 602 Pn for the processor Pn into the unlocked state. If the communication queue 602a of the communication regions 602 Pn was not empty at the time point of 1), the processing terminates at this point because interruption is not required.

5) The interruption indication unit 601a of the interruption control device 601 P0 sets information indicating the interruption in the interruption state holding device 601b of the interruption control device 601 Pn corresponding to the processor Pn. Thus, the processor Pn becomes interrupted.

6) The OS 300 Pn for single processor of the processor Pn receives the interruption based on the on the condition of the interruption state holding unit 601b of the interruption control device 601 Pn for the processor Pn.

7) The OS 300 Pn for single processor of the processor Pn releases its interrupted state by clearing the interruption information of its interruption state holding unit 601b via the interruption cancellation unit 601c of the interruption control device 601 Pn.

8) The OS 300 Pn for single processor of the processor Pn activates its control agent unit 500 Pn.

9) The control agent unit 500 Pn of the processor Pn sets a lock in the exclusion control region 602b of its communication region 602 Pn.

10) The control agent unit 500 Pn of the processor Pn deletes the information on the reason for communication and the communication data from the communication queue 602a of its communication region 602 Pn respectively.

11) The control agent unit 500 Pn of the processor Pn unlocks the exclusion control region 602b of the communication region 602 Pn for the processor Pn. Thus, the communication region 602 Pn for the processor Pn may be used by the other processors.

Thus, using the control processing relay unit 600, exchange of control signals and data between the first processor 100 and the second processor 200 is achieved.

In addition, the parallel processing system according to the respective embodiments mentioned above can be achieved by a parallel processing program having the respective functions of the parallel processing unit, the OS service unit, the control processing relay unit, and the agent unit. The parallel processing program is stored on a magnetic disk, a semiconductor memory, and other storage media, and loaded from the storage medium onto a computer processing device, and controls the operation of the computer processing device to achieve the above respective functions.

The present invention was described above by giving preferred embodiments and examples; however, the present invention is not limited to the above embodiments and examples, and may be implemented with various modifications within the scope of its technical idea.

According to the present invention as described above, by operating an OS and an existing application for single processor on a multiprocessor without modifying them, parallel processing by the multiprocessor with respect to the application can be achieved.

Moreover, according to the present invention, by implementing parallel processing units, OS service units, a control processing relay unit, and an agent unit as modules, an OS and an existing application for single processor can be operated without overheads on a multiprocessor system configuration without modifying the applications operated on the OS for single processor, such that benefit arising from parallel processing by the multiprocessor can be obtained.

Moreover, the tasks on the second processor side can perform file access using the services of the OS for single processor as-is without having to provide a processing unit for file access on the second processor side individually. In addition, since the exclusion processing for file access is completed on the first processor side, the parallel processing can be achieved without generating overheads due to exclusion processing such as in case the application is operated on the OS for multiprocessor.

Furthermore, by loading an OS for single processor having a virtual storage mechanism onto the processor on the first processor side and each processor on the second processor side, the above parallel processing can be achieved while performing memory protection between each process.

Furthermore, when either of the UOW (task/process) on the first processor side and the UOW on the second processor side, or both request processing to the parallel processing unit, the parallel processing units or the OS for single processor on the second processor side places the requesting UOW into the standby state, so that synchronous processing can be achieved.

Furthermore, when either of the UOW (task/process) on the first processor side and the UOW on the second processor side, or both request processing to the parallel processing unit, the parallel processing units or the OS for single processor on the second processor side proceeds with the execution of the requesting UOW, so that asynchronous processing can be achieved.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

The invention claimed is:

1. A parallel processing system,
wherein the parallel processing system is configured to operate an operating system (OS) and an application on a multiprocessor having a plurality of processors,
wherein the parallel processing system is configured to achieve parallel processing by said multiprocessor with respect to said application,
wherein said multiprocessor is logically divided into a first processor side comprising a first group of processors of the multiprocessor and a second processor side comprising a second group of processors of the multiprocessor, the system comprising:
a controller configured to control units of work associated with tasks of said application that are parallelizable within said application operating on a processor on said first processor side as new units of work on processors on said second processor side to be processed on said second processor side,
wherein said first processor side includes a parallel processing unit which belongs to a processor of said first group of processors,
said parallel processing unit is adapted to send to at least one of a processor of said second group of processors a request to perform tasks which are part of said application and which are capable of being run in parallel, and
based on said request, said at least one of processors of said second group is adapted to perform the tasks as a new task or tasks,
wherein a control processing relay unit for exchanging control signals and data between said first processor side and said second processor side is provided,
wherein said control processing relay unit is provided with interruption control devices corresponding to each processor, and communication regions corresponding to each processor,
said interruption control devices being configured by an interruption instruction unit for instructing the other processors to interrupt, an interruption state holding unit for holding the information that there was an interruption due to an interruption instruction, and an interruption cancellation unit for clearing the interruption, and
said communication regions are configured by a communication reason holding region for holding the information on the reason for communication from a communicating processor, a communication data holding region for holding communication data for communication, and an exclusion control region for locking the communication region for securing the communication.

2. The parallel processing system as set forth in claim 1, wherein the units of work that are parallelizable within said application are precreated on the processors on said second processor side.

3. The parallel processing system as set forth in claim 1, wherein the units of work that are parallelizable within said application are created and activated as new units of work on the processors on said second processor side.

4. The parallel processing system as set forth in claim 1, wherein said OS is for a single processor provided with a virtual storage mechanism and is mounted on a processor on said first processor side and each processor on said second processor side.

5. The parallel processing system as set forth in claim 4, wherein the new units of work on the processors on said second processor side are controlled synchronously or asynchronously with the units of work on the processor on said first processor side.

6. The parallel processing system as set forth in claim 1, wherein a parallel processing unit for performing controls related to the units of work including said creation of the units of work, and an OS service unit for providing a service for said OS to said units of work are incorporated on each of said first processor side and said second processor side.

7. The parallel processing system as set forth in claim 6, wherein an agent unit is provided on said first processor side to perform notification of various control signals between the units of work on said second processor side and said OS.

8. The parallel processing system as set forth in claim 6, wherein said parallel processing unit, the OS service unit, the control processing relay unit, and an agent unit are incorporated in a modular fashion.

9. The parallel processing system as set forth in claim 6, wherein a function is provided on said parallel processing unit on said second processor side for creating units of work to be parallelly processed by the other processors on said second processor side.

10. A parallel processing system,
wherein the parallel processing system is configured to operate an operating system (OS) and an application on a multiprocessor having a plurality of processors,
wherein the parallel processing system is configured to achieve parallel processing by said multiprocessor with respect to said application,
wherein said multiprocessor is logically divided into a first processor side comprising a first group of processors of the multiprocessor and a second processor side comprising a second group of processors of the multiprocessor, the system comprising:
a controller configured to control units of work associated with tasks of said application that are parallizable within said application operating on a processor on said first processor side as new units of work on processors on said second processor side to be processed on said second processor side,
wherein said first processor side includes a parallel processing unit which belongs to a processor of said first group of processors,
said parallel processing unit is adapted to send to at least one of a processor of said second group of processors a request to perform tasks which are part of said application and which are capable of being run in parallel, and
based on said request, said at least one of processors of said second group is adapted to perform the tasks as a new task or tasks,
wherein a control processing relay unit for exchanging control signals and data between said first processor side and said second processor side is provided,
wherein said control processing relay unit is provided with interruption control devices corresponding to each processor, and communication regions corresponding to each processor,
said interruption control devices being configured by an interruption instruction unit for instructing the other processors to interrupt, an interruption state holding unit for holding the information that there was an interruption due to an interruption instruction, and an interruption cancellation unit for clearing the interruption, and
wherein said communication regions are configured by a communication queue for holding communication data to communicate with the information on the reason for communication from the communicating processor, and an exclusion control region for locking the communication region for securing the communication.

11. A parallel processing system,
wherein the parallel processing system is configured to operate an operating system (OS) and an application on a multiprocessor having a plurality of processors,
wherein the parallel processing system is configured to achieve parallel processing by said multiprocessor with respect to said application,
wherein said multiprocessor is logically divided into a first processor side comprising a first group of processors of the multiprocessor and a second processor side comprising a second group of processors of the multiprocessor, the system comprising:
a control function configured to operate said OS and said application on a processor on said first processor side, and
a controller configured to control the units of work associated with tasks of said application that are parallelizable within said application as new units of work on the processors on said second processor side to be processed on said second processor side,
wherein said first processor side includes a parallel processing unit which belongs to a processor of said first group of processors,
said parallel processing unit is adapted to send to at least one of a processor of said second group of processors a request to perform tasks which are part of said application and which are capable of being run in parallel, and
based on said request, said at least one of processors of said second group is adapted to perform the tasks as a new task or tasks,
wherein a control processing relay unit for exchanging control signals and data between said first processor side and said second processor side is provided,
wherein said control processing relay unit is provided with interruption control devices corresponding to each processor, and communication regions corresponding to each processor,
said interruption control devices being configured by an interruption instruction unit for instructing the other processors to interrupt, an interruption state holding unit for holding the information that there was an interruption due to an interruption instruction, and an interruption cancellation unit for clearing the interruption, and
said communication regions being configured by a communication reason holding region for holding the information on the reason for communication from a communicating processor, a communication data holding region for holding communication data for communication, and an exclusion control region for locking the communication region for securing the communication.

12. The parallel processing system as set forth in claim 11, wherein the units of work that are parallelizable within said application are precreated on the processors on said second processor side.

13. The parallel processing system as set forth in claim 11, wherein the units of work that are parallelizable within said application are created and activated as new units of work on the processors on said second processor side.

14. The parallel processing system as set forth in claim 11, wherein said OS is for a single processor provided with a virtual storage mechanism and is mounted on the processor on said first processor side and each processor on said second processor side.

15. The parallel processing system as set forth in claim 14, wherein the new units of work on the processors on said second processor side are controlled synchronously or asynchronously with the units of work on the processor on said first processor side.

16. The parallel processing system as set forth in claim 11, wherein a parallel processing unit for performing controls related to the units of work including said creation of the units of work, and an OS service unit for providing a service for said OS to said units of work are incorporated on each of said first processor side and said second processor side.

17. The parallel processing system as set forth in claim 16, wherein said parallel processing unit, the OS service unit, the control processing relay unit, and an agent unit are incorporated in a modular fashion.

18. The parallel processing system as set forth in claim 16, wherein a function is provided on said parallel processing unit on said second processor side for creating units of work to be parallelly processed by the other processors on said second processor side.

19. A parallel processing system,
wherein the parallel processing system is configured to operate an operating system (OS) and an application on a multiprocessor having a plurality of processors,
wherein the parallel processing system is configured to achieve parallel processing by said multiprocessor with respect to said application,
wherein said multiprocessor is logically divided into a first processor side comprising a first group of processors of the multiprocessor and a second processor side comprising a second group of processors of the multiprocessor, the system comprising:
a control function configured to operate said OS and said application on a processor on said first processor side, and
a controller configured to control the units of work associated with tasks of said application that are parallelizable within said application as new units of work on the processors on said second processor side to be processed on said second processor side,
wherein said first processor side includes a parallel processing unit which belongs to a processor of said first group of processors,
said parallel processing unit is adapted to send to at least one of a processor of said second group of processors a request to perform tasks which are part of said application and which are capable of being run in parallel, and
based on said request, said at least one of processors of said second is adapted to perform the tasks as a new task or tasks,
wherein a control processing relay unit for exchanging control signals and data between said first processor side and said second processor side is provided,
wherein said control processing relay unit is provided with interruption control devices corresponding to each processor, and communication regions corresponding to each processor,
said interruption control devices being configured by an interruption instruction unit for instructing the other processors to interrupt, an interruption state holding unit for holding the information that there was an interruption due to an interruption instruction, and an interruption cancellation unit for clearing the interruption, and
wherein said communication regions are configured by a communication queue for holding communication data to communicate with the information on the reason for communication from the communicating processor, and an exclusion control region for locking the communication region for securing the communication.

20. The parallel processing system as set forth in claim 16, wherein an agent unit is provided on said first processor side to perform notification of various control signals between the units of work on said second processor side and said OS.

21. A computer readable medium containing a program for parallel processing by an operating system (OS) configured to operate an OS and an application on a multiprocessor having a plurality of processors and achieving parallel processing by said multiprocessor with respect to said application, the program when executed by the multiprocessor performing the steps of:
   on a system in which said multiprocessor is logically divided into a first processor side comprising a first group of processors of the multiprocessor and a second processor side comprising a second group of processors of the multiprocessor,
   operating said OS and said application on a processor on said first processor side,
   controlling units of work associated with tasks of said application that are parallelizable within said application operating on a processor on said first processor side as new units of work on processors on said second processor side to be processed on said second processor side, and
   performing a parallel processing function which sends to at least one of a processor of said second group of processors a request to perform tasks which are part of said application and which are capable of being run in parallel, and based on said request, performs the tasks as a new task or tasks on said at least one of processors of said second group, said performing comprising:
      setting, by the processor on the first processor side, a lock variable in an exclusion control region,
      storing, by the processor on the first processor side, information on a reason for communication into a communication reason holding region and communication data into a communication data holding region;
      setting, by an interruption instruction unit, information indicating an interruption in an interruption state holding unit;
      clearing, by a processor on the second processor side, the information indicating the interruption from the interruption state holding unit; and
      obtaining, by the processor on the second processor side, the information on the reason for communication from the communication reason holding region and the communication data from the communication data holding region.

22. The computer readable medium containing a program as set forth in claim 21, the program when executed by the multiprocessor further performing the step of
   precreating the units of work that are parallelizable within said application on the processor on said second processor side.

23. The computer readable medium containing a program as set forth in claim 21, the program when executed by the multiprocessor further performing the step of
   creating and activating the units of work that are parallelizable within said application as new units of work on the processor on said second processor side.

24. The computer readable medium containing a program as set forth in claim 21, wherein said program is executed on a system in which said OS has a virtual storage mechanism and is loaded on the processor on the first processor side and on each processor on said second processor side.

25. The computer readable medium containing a program as set forth in claim 24, the program when executed by the multiprocessor further performing the step of
   controlling the new units of work on the processors on said second processor side synchronously or asynchronously with the units of work on the processor on said first processor side.

26. The computer readable medium containing a program as set forth in claim 21, the program when executed by the multiprocessor further performing the steps of
   performing controls, via a parallel processing function, related to the units of work including said creation of the units of work, and
   providing a service for said OS to said units of work on each of said first processor side and said second processor side.

27. The computer readable medium containing a program as set forth in claim 26, the program when executed by the multiprocessor further performing the step of
   exchanging control signals and data between said first processor side and said second processor side.

28. The computer readable medium containing a program as set forth in claim 26, the program when executed by the multiprocessor further performing the step of
   notifying, via an agent function on said first processor side, various control signals between the units of work on said second processor side and said OS.

29. The computer readable medium containing a program as set forth in claim 26,
   wherein said parallel processing function on said second processor side creates units of work to be parallelly processed by the other processors on said second processor side.

30. A computer readable medium containing a program for parallel processing by an operating system (OS) configured to operate an OS and an application on a multiprocessor having a plurality of processors and achieving parallel processing by said multiprocessor with respect to said application, the program when executed by the multiprocessor performing the steps of:
   on a system in which said multiprocessor is logically divided into a first processor side comprising a first group of processors of the multiprocessor and a second processor side comprising a second group of processors of the multiprocessor,
   operating said OS and said application on a processor on said first processor side,
   controlling units of work associated with tasks of said application that are parallelizable within said application as new units of work on a processor on said second processor side to be processed on said second processor side, and
   performing a parallel processing function which sends to at least one of a processor of said second group of processors a request to perform tasks which are part of said application operating on the processor on the first processor side and which are capable of being run in parallel, and based on said request, performs the tasks as a new task or tasks on said at least one of processors of said second group, said performing comprising:
      setting, by the processor on the first processor side, a lock variable in an exclusion control region, storing, by the processor on the first processor side, information on a reason for communication into a communication reason holding region and communication data into a communication data holding region;

setting, by an interruption instruction unit, information indicating an interruption in an interruption state holding unit;

clearing by a processor on the second processor side, the information indicating the interruption from the interruption state holding unit; and obtaining, by the processor on the second processor side, the information on the reason for communication from the communication reason holding region and the communication data from the communication data holding region.

31. The computer readable medium containing a program as set forth in claim 30, the program when executed by the multiprocessor further performing the step of precreating the units of work that are parallelizable within said application on the processor on said second processor side.

32. The computer readable medium containing a program as set forth in claim 30 the program when executed by the multiprocessor further performing the step of creating and activating the units of work that are parallelizable within said application as new units of work on the processor on said second processor side.

33. The computer readable medium containing a program as set forth in claim 30, wherein said program is executed on a system in which said OS has a virtual storage mechanism and is loaded on the processor on the first processor side and on each processor on said second processor side.

34. The computer readable medium containing a program as set forth in claim 33, the program when executed by the multiprocessor further performing the step of controlling the new units of work on the processors on said second processor side synchronously or asynchronously with the units of work on the processor on said first processor side.

35. The computer readable medium containing a program as set forth in claim 30, the program when executed by the multiprocessor further performing the steps of performing, via a parallel processing function, control related to the units of work including said creation of the units of work, and providing a service for said OS for said units of work on the said first processor side and the second processor side respectively.

36. The computer readable medium containing a program as set forth in claim 35, the program when executed by the multiprocessor further performing the step of notifying, via an agent function on said first processor side, various control signals between the units of work on said second processor side and said OS.

37. The computer readable medium containing a program as set forth in claim 35, wherein said parallel processing function on said second processor side creates units of work to be parallelly processed by the other processors on said second processor side.

38. The computer readable medium containing a program as set forth in claim 30 the program when executed by the multiprocessor further performing the step of exchanging control signals and data between said first processor side and said second processor side.

* * * * *